(12) United States Patent
Xiu et al.

(10) Patent No.: US 11,461,847 B2
(45) Date of Patent: Oct. 4, 2022

(54) APPLYING A TRAINED MODEL TO PREDICT A FUTURE VALUE USING CONTEXTUALIZED SENTIMENT DATA

(71) Applicants: THE UNIVERSITY OF CHICAGO, Chicago, IL (US); President and Fellows of Harvard College, Cambridge, MA (US); Yale University, New Haven, CT (US)

(72) Inventors: Dacheng Xiu, Chicago, IL (US); Zheng Tracy Ke, Cambridge, MA (US); Bryan Kelly, New Haven, CT (US)

(73) Assignees: The University of Chicago, Chicago, IL (US); President and Fellows of Harvard College, Cambridge, MA (US); Yale University, New Haven, CT (US)

( * ) Notice: Subject to any disclaimer, the term of this patent is extended or adjusted under 35 U.S.C. 154(b) by 253 days.

(21) Appl. No.: 16/826,000

(22) Filed: Mar. 20, 2020

(65) Prior Publication Data

US 2020/0302540 A1    Sep. 24, 2020

Related U.S. Application Data

(60) Provisional application No. 62/821,575, filed on Mar. 21, 2019.

(51) Int. Cl.
*G06Q 40/00* (2012.01)
*G06Q 40/06* (2012.01)
(Continued)

(52) U.S. Cl.
CPC .......... *G06Q 40/06* (2013.01); *G06F 40/30* (2020.01); *G06N 5/02* (2013.01); *G06N 5/04* (2013.01); *G06N 20/00* (2019.01)

(58) Field of Classification Search
CPC .......... G06Q 40/06; G06N 20/00; G06N 5/02; G06N 5/04; G06F 40/30
See application file for complete search history.

(56) References Cited

U.S. PATENT DOCUMENTS

2009/0024504 A1* 1/2009 Lerman ................. G06Q 40/00
                                                                705/35
2012/0316916 A1* 12/2012 Andrews ........... G06Q 10/0635
                                                                705/7.29
(Continued)

FOREIGN PATENT DOCUMENTS

| CN | 103778215 | * | 5/2014 | ............ G06Q 10/04 |
| CN | 106227802 | * | 12/2016 | ............ G06K 9/6269 |
| KR | 2017/0009692 | * | 1/2017 | ............ G06Q 40/04 |

OTHER PUBLICATIONS

Dang Lien Minh et al. "Deep Learning Approach for Short-Term Stock Trends Prediction Based on Two-Stream Gated Recurrent Unit Network," IEEE Access, vol. 6, 2018 (Year: 2018).*

(Continued)

*Primary Examiner* — Alexander G Kalinowski
*Assistant Examiner* — William B. Bunker
(74) *Attorney, Agent, or Firm* — Norton Rose Fulbright US LLP

(57) ABSTRACT

Systems, methods, and computer-readable storage media facilitating automated testing of datasets including natural language data are disclosed. In the disclosed embodiments, rule sets may be used to condition and transform an input dataset into a format that is suitable for use with one or more artificial intelligence processes configured to extract parameters and classification information from the input dataset. The parameters and classes derived by the artificial intelligence processes may then be used to automatically generate (Continued)

various testing tools (e.g., scripts, test conditions, etc.) that may be executed against a test dataset, such as program code or other types of data.

18 Claims, 11 Drawing Sheets

(51) Int. Cl.
*G06F 40/30* (2020.01)
*G06N 5/04* (2006.01)
*G06N 5/02* (2006.01)
*G06N 20/00* (2019.01)

(56) References Cited

U.S. PATENT DOCUMENTS

| | | | |
|---|---|---|---|
| 2013/0138577 A1* | 5/2013 | Sisk | G06Q 40/04 705/36 R |
| 2017/0018033 A1* | 1/2017 | Lee | G06Q 40/06 |
| 2018/0182038 A1* | 6/2018 | Di Sciullo | G06Q 30/0201 |

OTHER PUBLICATIONS

Liu et al., "TASC: Topic-Adaptive Sentiment Classification on Dynamic Tweets," IEEE Transactions on Knowledge and Data Engineering, vol. 27, No. 6, Jun. 2015 (Year: 2015).*
Janda et al., "Syntactic, Semantic and Sentiment Analysis: The Joint Effect on Automated Essay Evaluation," IEEE Access, vol. 7, 2019 (Year: 2019).*
Antweiler et al., "Is All That Talk Just Noise? The Information Content of Internet Stock Message Boards" *The Journal of Finance* 2005, 59, 1259-1294.
Biei et al., "Latent Dirichlet Allocation" *Journal of Machine Learning Research* 2003, 3, 993-1022.
Cowles, Alfred, "Can stock market forecasters forecast?" *Econometrica: Journal of the Econometric Society* 1933, 309-324.
Fama, Eugene F., "Efficient capital markets: A review of theory and empirical work" *The Journal of Finance* 1970, 25, 383-417.
Fan et al., "Sure independence screening for ultrahigh dimensional feature space" *Journal of the Royal Statistical Society: Series B (Statistical Methodology)* 2008, 70, 849-911.
Feng et al., *Taming the Factor Zoo, Technical report*. 2017. University of Chicago.
Freyberger et al., *Dissecting characteristics non-parametrically, Technical report*. 2017. University of Wisconsin-Madison.
Genovese et al., "A comparison of the lasso and marginal regression" *Journal of Machine Learning Research* 2012, 13, 2107-2143.
Gentzkow et al., "Text as Data" *Journal of Economic Literature* 2019, 57(3), 535-574.
Gu et al., *Empirical asset pricing via machine learning, Technical report*. 2018. University of Chicago.
Hofmann, Thomas. "Probabilistic latent semantic analysis." *Proceedings of the Fifteenth conference on Uncertainty in artificial intelligence*, Morgan Kaufmann Publishers Inc., 1999, 289-296.
Huang et al., "Evidence on the Information Content of Text in Analyst Reports" *The Accounting Review* 2014, 89, 2151 -2180.
James et al., "Estimation with quadratic loss." *Proceedings of the fourth Berkley symposium on mathematical statistics and probability*, 1961, 1, 361 -379.
Jegadeesh et al., "Word power: A new approach for content analysis" *Journal of Financial Economics* 2013, 110, 712-729.
Ji et al., "Ups delivers optimal phase diagram in high-dimensional variable selection" The Annals of Statistics 2012, 40, 73-103.
Ke et al., *A new svd approach to optimal topic estimation, Technical Report*. 2017. Harvard University.
Kelly et al., *Some characteristics are risk exposures, and the rest are irrelevant, Technical report*. 2017. University of Chicago.
Kozak et al., *Shrinking the cross section, Technical Report*. 2017. University of Michigan.
Li, Feng. "The information Content of Forward-Looking Statements in Corporate Filings—A Naïve Bayesian Machine Learning Approach" *Journal of Accounting Research* 2010, 48, 1049-1102.
Loughran et al., "When is a liability not a liability? Textual analysis, dictionaries, and 10-ks" *The Journal of Finance* 2011, 66, 35-65.
Loughran et al., "Textual Analysis in Accounting and Finance: A Survey" *Journal of Accounting Research* 2016, 54, 1187-1230.
Manela et al., "News implied volatility and disaster concerns" *Journal of Financial Economics* 2017, 123, 137-162.
Mikolov et al., "Distributed representations of words and phrases and their compositionality" *Advances in neural information processing systems* 2013, 3111-3119.
Shorack et al., *Empirical processes with applications to statistics* vol. 59, SIAM, 2009.
Tetlock, Paul C., "Giving Content to Investor Sentiment: The Role of Media in the Stock Market" *The Journal of Finance* 2007, 62, 1139-1168.

\* cited by examiner

FIG. 10(A)

| S | Count |
|---|---|
| fall | 4 |
| erode | 1 |
| soften | 1 |
| hurt | 1 |
| article | 1 |

FIG. 10(B)

APPLYING A TRAINED MODEL TO PREDICT A FUTURE VALUE USING CONTEXTUALIZED SENTIMENT DATA

PRIORITY

The present application claims the benefit of U.S. Provisional Application No. 62/821,575, filed Mar. 21, 2019, and entitled "PREDICTING RETURNS WITH TEXT DATA," the contents of which are incorporated herein by reference in their entirety.

TECHNICAL FIELD

The present disclosure generally relates to asset return prediction techniques and more specifically to systems and methods for extracting sentiment information to predict asset returns.

BACKGROUND

Text mining methodologies are utilized to predict trends in market behavior and often attempt to extract sentiment information from online data sources (e.g., news articles) to gauge market sentiment and predict asset returns. One known text mining methodology extracts sentiment information by searching for positive and negative terms based on a pre-defined sentiment dictionary (e.g., the Harvard-IV psychosocial dictionary) and then individually counting the number of positive and negative terms in the news article. The number of positive and negative terms are summed to determine a sentiment score for the news article, which is later utilized to predict asset movement. To illustrate, if a news article is determined to recite 15 positive terms and 10 negative terms, the news article is given a sentiment score of +5, indicating that the article has an overall positive sentiment.

However, such text mining methodologies suffer from some serious drawbacks. For example, just summing the numbers of positive and negative sentiment terms discounts the significance of some terms over others. To illustrate, assume a news article regarding Company A's recent quarterly conference call includes a positive or ambiguous term (depending on context) such as "undervalue," and negative terms such as "disappointing" and "blame." Existing text mining methodologies may rate the article as having a negative sentiment score, ignoring that the article may have concluded that the stock is undervalued and the terms "disappointing" and "blame" could have been less significant than the term "undervalue." To overcome this deficiency, some text mining methodologies add weights to the positive and negative terms identified using the Harvard-IV psychosocial dictionary. However, no clear rule governing the choice of weights has been established, and the ultimate choice of weights has typically been ad hoc. Such ad hoc weighting fails to accurately weigh terms and provide information necessary to predict trends in market behavior.

SUMMARY

To overcome the challenges described above, the present disclosure provides systems, methods, and computer-readable storage media for asset return prediction by extracting sentiment information from news articles using a sentiment extraction model that is trained using historical news and historical returns data. The training of the sentiment extraction model includes identification of words, which when present in the historical news articles, have a correlation to a subsequent historical positive or negative price movement (i.e., return). For example, the training of the sentiment extraction model includes extracting words carrying sentiment information from historical news articles and correlating the extracted words with historical asset returns. Predicting asset movement by extracting sentiment information using the sentiment extraction model described herein provides significantly better returns as compared to the previously used sentiment extraction techniques. In that regard, the present disclosure provides one or more methodologies that may be used in the training of the sentiment extraction model and provides one or more methodologies on using the sentiment extraction model to predict asset return.

Illustrating the functionality of the sentiment extraction model, the systems and methods may use Dow Jones Newswire (or some other source of financial news) to receive raw textual data corresponding to current news. The raw textual data may include textual data from one or more news articles tagged with the stock ticker of one or more assets. The raw textual data may first be processed using natural language processing (NLP) to extract features from within the raw textual data. The NLP may include normalization, stemming, lemmatization, tokenization on the received raw textual data. After the NLP, the extracted features may be provided to the sentiment extraction model to estimate sentiment score for each of the one or more news articles. In one implementation, the sentiment scores related to a particular asset may then be averaged to generate an average sentiment score for the particular asset. The average sentiment score may then be used to predict asset movement and determine one or more actions (e.g., buy or sell) for the particular asset.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE FIGURES

For a more complete understanding of the disclosed methods and apparatuses, reference should be made to the embodiments illustrated in greater detail in the accompanying drawings, wherein:

FIG. 10(A) is an illustrative depiction of the first parameter; and

FIG. 10(B) depicts an illustrative table related to the second parameter.

It should be understood that the figures are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Aspects of the present disclosure provide improved processes for extracting sentiment information from current news articles using a sentiment extraction model that is trained using historical news and historical returns data. Inventive aspects more accurately characterize sentiment information, which is used to more accurately predict asset returns. For example, disclosed concepts have been shown to provide up to a 94% gain in some scenarios over known methods. Further, disclosed concepts enable a sentiment extraction model to be periodically retrained allowing evolving trends in sentiment to be accounted for by the model. This capability enables dynamic retraining of the sentiment extraction model, facilitating strong return prediction with up-to-date sentiment analysis.

Figure 1:
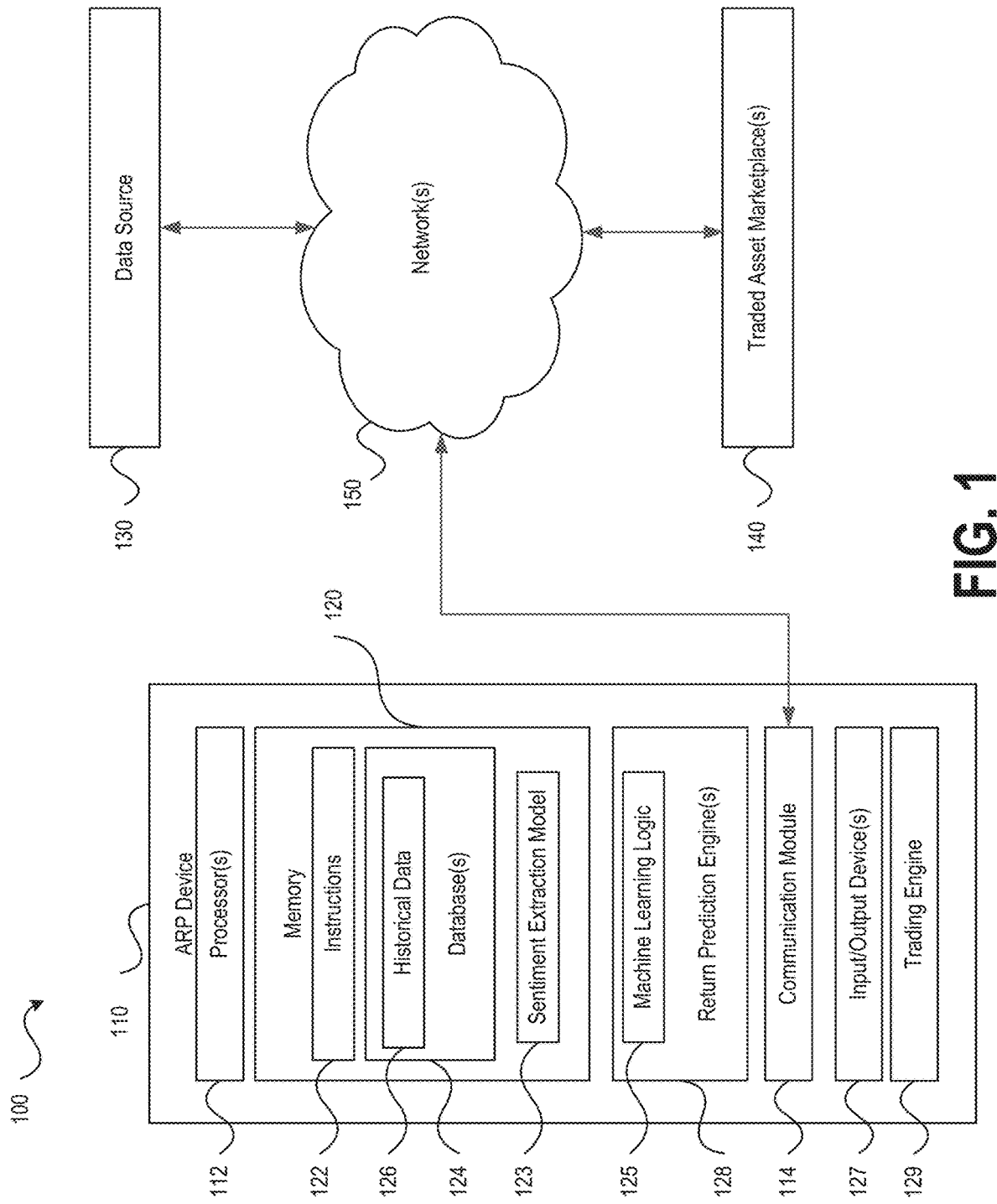
FIG. 1 is a block diagram illustrating a system for predicting asset return using a sentiment extraction model, in accordance with aspects of the present disclosure.

Referring to FIG. 1, a block diagram illustrating a system for predicting asset returns in accordance with aspects of the present disclosure is shown as a system 100. The system 100 may provide functionality that facilitates sentiment analysis and predicts asset movement. As shown in FIG. 1, the system 100 includes an asset return prediction (ARP) device 110. The ARP device 110 includes one or more processors 112, a memory 120, one or more communication modules 114, one or more input/output (I/O) devices 127, one or more return prediction engines 128, and a trading engine 129. Each of the one or more processors 112 may be a central processing unit (CPU) or other computing circuitry (e.g., a microcontroller, one or more application specific integrated circuits (ASICs), and the like) and may have one or more processing cores. The memory 120 may include read only memory (ROM) devices, random access memory (RAM) devices, one or more hard disk drives (HDDs), flash memory devices, solid state drives (SSDs), network attached storage (NAS) devices, other devices configured to store data in a persistent or non-persistent state, or a combination of different memory devices.

The memory 120 may store instructions 122 that, when executed by the one or more processors 112, cause the one or more processors 112 to perform the operations described in connection with the ARP device 110 with reference to FIGS. 1-8. The memory 120 may also include a database 124 which may further include historical data 126 utilized by a machine learning logic 125 to generate the sentiment extraction model 123 which is employed to predict future asset movement. In one implementation, the sentiment extraction model 123 may be stored in memory 120. The historical data 126 may include data obtained from one or more data sources 130. In one implementation, the one or more data sources 130 may include the Dow Jones Newswires Machine Text Feed and Archive database. It is noted that FIG. 1 shows a single data source 130 for purposes of illustration, rather than by way of limitation and that the one or more data sources 130 may include more than one data source depending on the particular configuration of the system 100, the assets to be analyzed by the system 100, or for other reasons. It is also noted that the one or more data sources 130 may include live text data feeds which could include real-time news feeds. In one implementation, in addition to the live text data feeds, the historical data 126 includes market capitalization and daily returns data provided by data source 130. The historical data 126 may further include data derived from historical news data obtained by a data source 130. As an example, the historical data 126 may include correlated historical news and historical returns data derived using the text feed and return information. In one implementation, the correlation may be performed by the ARP device 110 linking each article with tagged assets' market capitalization and daily returns information; this linking is described in detail with respect to FIG. 3.

The one or more communication modules 114 may be configured to communicatively couple the ARP device 110 to the one or more networks 150 via wired or wireless communication links according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a 3rd Generation (3G) communication standard, a 4th Generation (4G)/long term evolution (LTE) communication standard, a 5th Generation (5G) communication standard, and the like).

The I/O devices 127 may include one or more display devices, a keyboard, a stylus, one or more touchscreens, a mouse, a trackpad, a camera, one or more speakers, haptic feedback devices, or other types of devices that enable a user to receive information from or provide information to the ARP device 110. The I/O devices 127 may also include a graphical user interface (GUI). In aspects, I/O devices 127 may further include a mobile device, a smartphone, a tablet computing device, a personal computing device, a laptop computing device, a desktop computing device, a wearable computing device, a computer system of a vehicle, a personal digital assistant (PDA), a smart watch, another type of wired and/or wireless computing device, or any part thereof. In aspects, the user may use the GUI to input information, including authentication information to gain access to the functionality of the ARP device 110, which at least in part includes extracting sentiment information of the current news and providing functionality to use the sentiment information to generate a portfolio of assets to be traded using the trading engine 129 at the traded asset marketplace 140 (e.g., NASDAQ, New York Stock Exchange, etc.).

The one or more return prediction engines 128 may be configured to utilize machine learning (and/or artificial intelligence) logic 125 to generate the sentiment extraction model 123, which processes features extracted from an input dataset (e.g., raw textual data obtained from the one or more data sources 130) and produces one or more outputs (e.g., sentiment scores, etc.). It is noted that the input dataset may be derived from data obtained from data source 130, such as current news articles related to assets to be analyzed. The input dataset may include raw textual data—data in the form of natural language text—derived from current news articles related to a particular asset, and the one or more outputs may include a sentiment score of the article. It is noted that the sentiment score may be assigned on a per article basis or multiple sentiment scores may be assigned to a single article, such as assigning a sentiment score to each asset identified in an article associated with multiple assets. Using the sentiment score, price movement of the asset may be predicted. It is noted that processing of input datasets that include raw textual data is described for purposes of illustration, rather than by way of limitation and that the sentiment extraction techniques disclosed herein may be readily applied to other types of input datasets (e.g., voice data obtained from video news sources, or image data) that do not have a specific structure.

In some implementations, the raw textual data included in news articles obtained from the one or more data sources 130 may be published at different times. To ensure that the information considered by the system 100 when making return predictions is not stale, the system 100 may be configured to consider news articles published within a particular time period. News articles published within a pre-defined time period (e.g., 24 hours, 12 hours, 6 hours, 2 days, or some other timeframe) may be considered "current news articles" and may be included in the input dataset for a given return prediction process. News articles that were published before the pre-defined time period may not be considered for a current return prediction process (e.g., if the time period is 24 hours, news articles published 25 hours or more prior to the asset prediction run may be excluded from the input data set). For example, news articles associated with a particular asset published between 9:30 am on day 0 and 9:00 am on day 1 may be considered current and considered in a current return prediction run, but articles published prior to 9:30 am on day 0 may not be included in the input data set for the current return prediction run. This desired time period may relate to the freshness/newness/novelty of the news, which may improve the return predictions by not accounting for "stale" news that could skew the return prediction. To that end, ARP device 110 may be further configured to gauge the freshness of a current news article and shortlist the news articles to be provided to the sentiment extraction model 123 based on the freshness of the news. Details on the techniques that could be used to capture freshness of current news articles is described ahead in detail.

The one or more return prediction engines 128 may include a set of conditioning rules that may be applied to the input dataset to condition the dataset prior for processing by the sentiment extraction model 123, which may not be capable of receiving natural language text data as an input. The set of conditioning rules may be configured to modify the input dataset via different operations, such as changing all words in the article to lower case letters; expanding contractions such as "haven't" to "have not," and deleting numbers, punctuations, special symbols, and non-English words. The set of conditioning rules may further include stemming, lemmatization, tokenization; and other operations. In addition to the set of conditioning rules described above, the set of conditioning rules may be configured to extract features from within the received raw textual data that indicates positive or negative return. For example, the extracted features may include a count vector derived from the news article and a total count of words included in the news article that are known to convey some sentiment information.

Trading engine 129 may be configured to generate a GUI for facilitating input and output operations that enable a user to perform one or more trading actions with respect to assets analyzed by the system 100. The GUI generated by the trading engine 129 may be configured to include various GUI controls related to a trading platform. In accordance with this disclosure the various GUI controls may include extracting sentiment information for one or more assets, managing market positions based on the extracted sentiment information via traded asset marketplace 140, gathering real-time quotes, charting tools, viewing news feeds, and the like. The various GUI controls may also allow user to control one or more aspects of sentiment extraction, such as selecting one or more asset ticker(s) for analysis by the system 100 or selecting data sources from which to obtain an input data set. For example, the GUI generated by the trading engine 129 may allow user to enter asset ticker information and select a news data source. The GUI may further be configured to include GUI controls for allowing the user to make trades at the traded asset marketplace(s) 140. In an aspect, the trading engine 129 is configured to provide functionality to the user, via the GUI, to form portfolios of stocks based on their extracted sentiment scores. The trading engine 129 is configured to execute trades corresponding to the portfolio. The trading engine 129 may provide the trading functionalities via an application programming interface (API) that is configured to communicate with traded asset marketplaces 140 through the network 150. The GUI generated by the trading engine 129 may further be configured to include GUI controls for allowing the user to shortlist a finite number top assets/stocks carrying high sentiment score based on the current news. Likewise, the GUI generated by the trading engine 129 may further be configured to include GUI controls for allowing the user to shortlist a finite number top assets/stocks carrying low sentiment score based on the current news. The GUI generated by the trading engine 129 may further be configured to include GUI controls for allowing the user to form one or more portfolios including one or more assets from the finite list with high and low sentiment scores. To illustrate, a user may form a portfolio of stocks carrying high sentiment scores and buy the portfolio of stocks.

It is noted that the various logical and modules described herein and illustrated in the accompanying drawings, as well as the functionality they provide, may be provided via hardware, software, or a combination of hardware and software. For example, the functionality may be stored as the instructions 122 of FIG. 1 that may be executed by the processors 112 to perform the functionality described herein. Additionally or alternatively, at least some of the functionality of the illustrated logical blocks and modules may be performed by hardware circuit comprising custom VLSI circuits or gate arrays, semiconductors such as logic chips, transistors, or other discrete components.

It is noted that FIG. 1 illustrates the ARP device 110 as a standalone-type server or set of servers for purposes of illustration, rather than by way of limitations and that the operations described in connection with the ARP device 110 may be provided in other system configurations, such as via a cloud-based system. In such a system, one or more components of ARP device 110, such as sentiment extraction model 123, return prediction engine 128, and trading engine 129, may be configured to provide the functionality described herein with respect to extracting sentiment score and predicting asset movement as a cloud-based service. For example, a user may be provided with network-based access to the sentiment analysis and trading functionality provided via computing resources disposed on the cloud. The user may be authenticated with the cloud-based sentiment extraction model 123, return prediction engine 128, and trading engine 129 and may perform desired functionalities (e.g., check sentiment scores of one or more assets, build portfolio based on sentiment scores, execute trades based on sentiment score). One or more graphical user interfaces (e.g., web-based interfaces, etc.) may be provided to facilitate access to the cloud-based functionality.

As explained above, the input data received by the return prediction engine 128 may be an input dataset that includes raw textual data obtained from the data source 130. The input dataset may include one or more news articles related to a particular asset and the news articles may include raw textual data in a natural language format. In some aspects, the input dataset may include news articles related to more than one asset. As briefly described above, the raw textual data in the natural language format may not suitable as an input to a machine learning model (such as the sentiment extraction model 123) since natural language text data does not directly provide the parameters or features (e.g., a count vector of the news article, a total count of words with some sentiment information associated with them) utilized by the sentiment extraction model 123. To facilitate operation of the machine learning models disclosed herein, the raw textual data of the input data set may be subjected to one or more transformations before being utilized by the sentiment extraction model 123. For example and referring to FIG. 2(A), a block diagram illustrating a process for transforming the raw textual data into a set of features suitable for use with machine learning techniques in accordance with aspects of the present disclosure is shown.

Figure 2A:
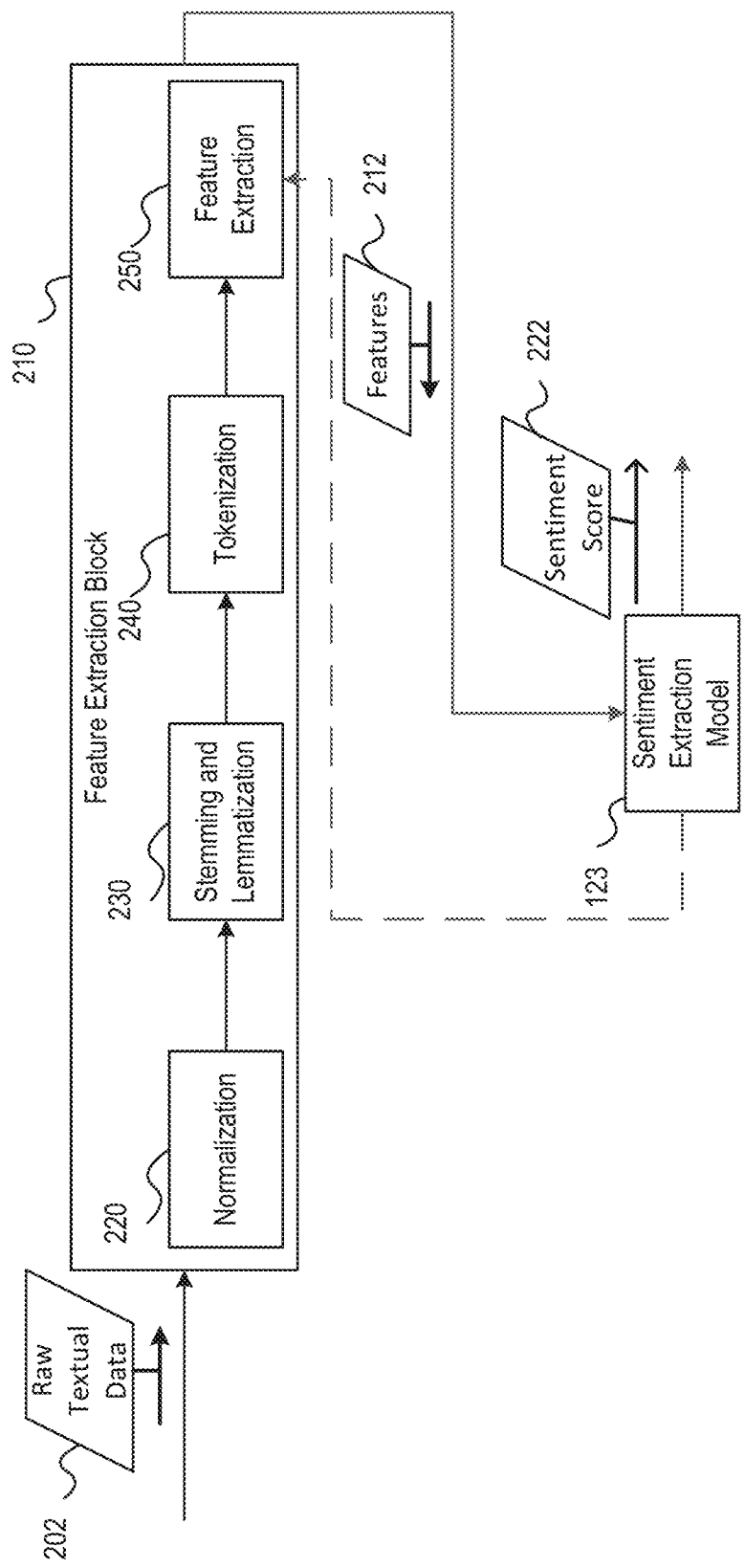
FIG. 2(A) is a block diagram illustrating a process for transforming the raw textual data from current news into a set of features suitable for use with the sentiment extraction model, in accordance with aspects of the present disclosure.

FIG. 2(A) depicts a feature extraction block 210, which, in one implementation, may be a part of the one or more return prediction engines 128. As shown in FIG. 2(A), raw textual data 202 (e.g., one or more news articles obtained from the one or more data sources 130 of FIG. 1) may be processed to extract the features that may be provided as inputs to the sentiment extraction model 123 to obtain sentiment information pertaining to an asset or assets identified in the input data set. Once the sentiment information has been obtained, it may be used to predict price movement with respect to the identified assets, as described in more detail below. As shown in FIG. 2(A), the raw textual data 202 may be provided to a feature extraction block 210. The feature extraction block 210 may include a normalization block 220, a stemming and lemmatization block 230, a tokenization block 240, and a feature extraction module 250. Each of the blocks 220, 230, 240, and 250 may be configured to provide functionality for processing the raw textual data 202 to generate a set of features 212. In an aspect, the functionality provided by the feature extraction block 210 may be provided via execution of a set of rules against the raw textual data 202, such as the set of conditioning rules described above.

The normalization block 220 may be configured to convert the case of all the words in the raw textual data 202 into lower case. The normalization block 220 may further be configured to expand contractions such as "haven't" to "have not" and delete numbers, punctuation marks, special symbols, stop words, hypertext markup language (HTML) tags, and non-English words. For example, the normalization block 220 may remove hypertext markup language (HTML) links, stop words (e.g., "a", "an", "the", etc.), punctuation marks (e.g., periods, commas, semi-colons, etc.), uniform resource locators (URLs), special symbols, and the like from the raw textual data 202. The stemming and lemmatization block 230 may be configured to remove suffixes from words, such as to remove "ing", "ed", or other suffixes from words present in the raw textual data 202, and the like. In some implementations, stemming and lemmatization block 230 may also be configured to group together different forms of a word to analyze them as a single root word (e.g., "disappointment" to "disappoint," "likes" to "like," and so forth).

Tokenization block 240 may perform a tokenization process in which text data may be broken up into individual words and each individual word represents a token. Additionally, during tokenization, a list of words may be linked to the article from which they were gathered or processed. Certain elements of the text data may be treated as special token elements, such as white spaces, and these additional token elements may be handled differently than tokens associated with words within the text data, such as by removing white space tokens.

To illustrate the concepts described above, suppose that the raw textual data 202 includes natural language data from one article associated with a particular asset. This article may include financial news related to the asset and in addition to natural language data, the financial news may also include numerical data, and other kinds of special data, e.g., financial graphs, URLs, HTML data, and the like. Through the above-described functional blocks and the processes, each block of the raw textual data 202 is subjected to various lexical analysis techniques to identify words, remove punctuation, remove stop words, convert upper case words and letters to lower case words and letters and the like. In addition to utilizing lexical analysis, post-lexical analysis processes may be utilized and may focus on the raw textual data not at the text level but on word level via processes such as stemming and lemmatization, which enables the raw textual data to be converted or tokenized data suitable for feature extraction by the feature extraction module 250.

The feature extraction module 250 may be configured to extract one or more features for each of the news article. In one implementation, the one or more features may include a count vector for each news article and a total count of words carrying some sentiment information for each news article. The feature extraction module 250 may be configured to generate a set of input parameters that may be provided to the sentiment extraction model 123. For example, the set of input parameters may include a first parameter ($d_i$) and a second parameter ($s_i$). The first parameter ($d_i$) may be a count vector of the corresponding article, and the second parameter ($s_i$) may be a count of sentiment charged words identified in the corresponding article. To illustrate the generation of the first and second parameters, following tokenization block 240, the output of the tokenization block 240 is provided to the feature extraction module 250, which is configured to count the number of times a word appears in the corresponding article to capture the first feature ($d_i$) and count the total number of sentiment charged words that are present in the corresponding article. In one embodiment, the first parameter ($d_i$) may be generated by counting the number of times each tokenized word appear in the article; and the second parameter ($s_i$) may be generated by counting the number of words in the first parameter that belong to an estimator $\hat{S}$. The estimator $\hat{S}$, as further described below, may include a list of words that carry sentiment information and have a correlation to a positive or negative price movement based on the historical data analysed by the machine learning logic 125. In some embodiments, the estimator $\hat{S}$ may be provided to the feature extraction module 250 via the sentiment extraction model 123.

The features 212 output by the feature extraction module 250 may be structured for use by the sentiment extraction model 123. To illustrate, as shown in FIG. 2(A), the features 212, which are no longer in natural language format and instead include numerical data (e.g., $d_i$ and $s_i$), may be provided as an input to the sentiment extraction model 123, thereby enabling the sentiment extraction module 123 to analyze the sentiment of the raw textual data 202. In an aspect, the sentiment extraction model 123 includes estimators obtained from the machine learning logic 125; the estimators are configured to utilize the features 212 to extract sentiment information. In one implementation, the estimators employed by the sentiment extraction model 123 include $\hat{S}$ and $\hat{O}$; $\hat{S}$, as noted above, includes a list of words that carry sentiment information and have a correlation to a positive or negative price movement based on the historical data analysed by the machine learning logic 125, and $\hat{O}$ is configured to associate a frequency count of sentiment charged words with a positive or negative return. Stated another way, $\hat{O}$ is configured to receive information indicative of a frequency with which sentiment charged words appear in the historical or current news data and characterizes the input information as indicating a positive or negative price movement. As such, the features 212 (first parameter ($d_i$) and the second parameter ($s_i$)) may be utilized by the estimator $\hat{O}$ at the sentiment extraction model 123 to characterize whether the current news article has a positive or negative sentiment, thereby indicating a positive or negative price movement. Obtaining the estimators from the machine learning logic 125 is described in detail below in FIG. 2(B), and the concepts behind sentiment extraction model 123 using the features 212 with one or more of the estimators to extract sentiment information are described following the description of FIG. 2(B).

Still referring to FIG. 2(A), when the features 212 are provided to the sentiment extraction model 123, it generates a sentiment score 222 for each of the articles included in raw textual data 202. The sentiment score output by the sentiment extraction model 123 may lie between a numerical range, such as 0 and 1, where 1 may indicate that the article's sentiment is maximally positive, and 0 may indicate that the article's sentiment is maximally negative. As such, the score output by the sentiment extraction model 123 may indicate a future positive or negative price movement with respect to one or more assets identified in the raw textual data 202, and thus can be used to predict asset price movement. For example, an article with a sentiment score of 0.91 may indicate positive sentiment, and thus infers positive future price movement. In contrast, an article with a sentiment score of 0.36 indicates a negative sentiment, and thus infers negative future price movement. The inferred positive future price movement may indicate that the asset should either be bought and/or held longer to get better returns, and the negative future price movement may indicate that the asset should be sold and/or shorted. The sentiment score output by the sentiment extraction model 123 may also indicate the strength of the return (e.g., a score closer to 1, e.g., 0.89, may indicate a higher positive movement than a score away from 1, e.g., 0.65; a score closer to 0, e.g., 0.1, may indicate a higher negative movement than a score away from 0, e.g. 0.4), and the strength of return could also be used to infer whether the asset should be bought or sold.

It is noted that the description above provides extracting features from a single current article and using the extracted features to generate a sentiment score, which is then used to predict asset price movement. However, it should be appreciated that the sentiment extraction model 123 can be used to extract sentiment scores of a plurality of current articles. For example, after extracting features from a plurality of articles related to a particular asset, the extracted features may be provided to the sentiment extraction model 123 to estimate sentiment score for each of the plurality of articles. In one implementation, the sentiment scores related to the particular asset may then be averaged to generate an averaged sentiment score for the particular asset. The averaged sentiment score may then be used to predict asset movement and determine one or more actions (e.g., buy or sell) for the particular asset. In another implementation, the extracted features ($d_i$, $s_i$) of multiple articles for a single asset may be aggregated (e.g., averaged or weighted averaged), and the aggregated extracted features may be used to generate a sentiment score. Similarly, it should be appreciated that the sentiment extraction model 123 can also be used to extract sentiment scores of a plurality of stocks, where each stock has a plurality of current articles associated with it.

Before describing the training of the sentiment extraction model 123 using the historical news data and historical returns data, exemplary notations, assumptions, and mathematical frameworks that may be considered are first described.

Consider a collection of n news articles and a dictionary of m words. In generating the sentiment extraction model 123, a count of words of an $i^{th}$ article in a vector $d_i \in \mathbb{R}_+^m$ so that $d_{i,j}$ represents the number of times word j occurs in article i. This can also be represented in an n×m document-term matrix, $D=[d_1, \ldots, d_n]'$. While performing the mathematics involved in the training of the sentiment extraction model 123, a subset of columns from D may be used. The indices of columns included in the subset may be listed in a set S. The corresponding submatrix may be denoted as $D_{\cdot,[S]}$, and $d_{i,[S]}$ may be used to denote the row vector corresponding to the $i^{th}$ row of $D_{\cdot,[S]}$. Furthermore, it is noted that the historical news articles obtained from the data source 130 (e.g., Dow Jones Newswires Machine Text Feed and Archive database) are tagged with the asset tickers (e.g., AAPL for articles related to Apple). For the sake of simplicity, the training procedure described herein studies articles that correspond to a single stock. It is further noted that the historical news article i is labeled with the associated stock return (or its idiosyncratic component), $y_i$, on the publication date of the article being studied.

The assumptions made while training the sentiment extraction model 123 are described now. It is assumed that each article gathered from the data source 130 possesses a sentiment score, $p_i$, which lies between [0,1]; when the value of the sentiment score is 1, the article's sentiment is assumed to be maximally positive, and when the sentiment score is 0, the article's sentiment score is assumed to be maximally negative. It is further assumed that the sentiment score serves as a sufficient statistic which influences a stock's price movement. In other words, $d_i$ and $y_i$ are assumed to be independent given $p_i$.

Along with the above-noted conditional independence assumption, two additional assumptions are made. One deals with the distribution of the stock return $y_i$ given $p_i$, and the other governs the article word count vector $d_i$ given $p_j$. For the conditional return distribution, it is assumed that:

$$\mathbb{P}(\text{sgn}(y_i)=1)=g(p_i) \text{ for } a \text{ monotone increasing function } g(\cdot),$$

where sgn(x) is the sign function that returns 1 if x>0 and 0 otherwise. Stated another way, this assumption states that the higher the sentiment score, the higher the probability of realizing a positive return. For the conditional distribution of word counts in an article, we assume the dictionary has a partition:

$$\{1,2,3,\ldots,m\}=S \cup N$$

where S is the index set of words that carry some sentiment information (also referred to herein as sentiment-charged words), N is the index set of the words that are neutral (also referred to herein as sentiment-neutral words), and {1, 2, 3, ..., m} is the set of indices for all the words in the dictionary, with S and N having dimensions |S| and m−|S|, respectively. Likewise, $d_{i,[S]}$ and $d_{i,[N]}$ are the corresponding sub-vectors of $d_i$ and contain counts of sentiment-charged words and sentiment-neutral words, respectively. Furthermore, it is assumed that $d_{i,[N]}$ and $d_{i,[S]}$ are independent of each other, and because the vector of interest $d_{i,[S]}$ is independent of $d_{i,[N]}$, $d_{i,[N]}$ is not modeled.

It may be further assumed that the sentiment-charged word counts, $d_{i,[S]}$, are generated by a mixture multinomial distribution of the form:

$$d_{i,[S]} \sim \text{Multinomial}(s_i, p_i O_+ + (1-p_i) O_-),$$

where $s_i$ is the total count of sentiment-charged words in the article i, and therefore determines the scale of the multinomial. Further, the probabilities of individual word counts with a two-topic mixture model are modelled. $O_+$ represents a probability distribution over words. $O_+$ is a positive sentiment topic. Stated another way, $O_+$ represents expected word frequencies in a maximally positive sentiment article (one for which sentiment score is 1) and is an |S| vector of non-negative entries with unit $1^1$-norm. Similarly, $O_-$ is a negative sentiment topic that describes distribution of word frequencies in a maximally negative article (those for which sentiment score is 0). At intermediate values of sentiment score, $0<p_i<1$, word frequencies may be a convex combination of those from the positive and negative sentiment topics. For example, a word j is considered to be a positive word of the $j^{th}$ entry of $(O_+-O_-)$ is positive; in other words, if the word has a larger weight in the positive sentiment topic than in the negative sentiment topic, it is considered to be positive. Similarly, a word j is considered to be a negative word if the $j^{th}$ entry of $(O_+-O_-)$ is negative.

It is noted that, for a given article i, the distribution of sentiment-charged word counts and the distribution of stock returns are linked through a common parameter, $p_i$. Stock returns information may be used to supervise the estimation and help identify which words are assigned to the positive versus negative topic. A higher $p_i$ value maps into a higher likelihood of positive returns, and thus words that co-occur with positive returns are assigned high values in $O_+$ and words that co-occur with negative returns are assigned low values in $O_-$.

Figure 2B:
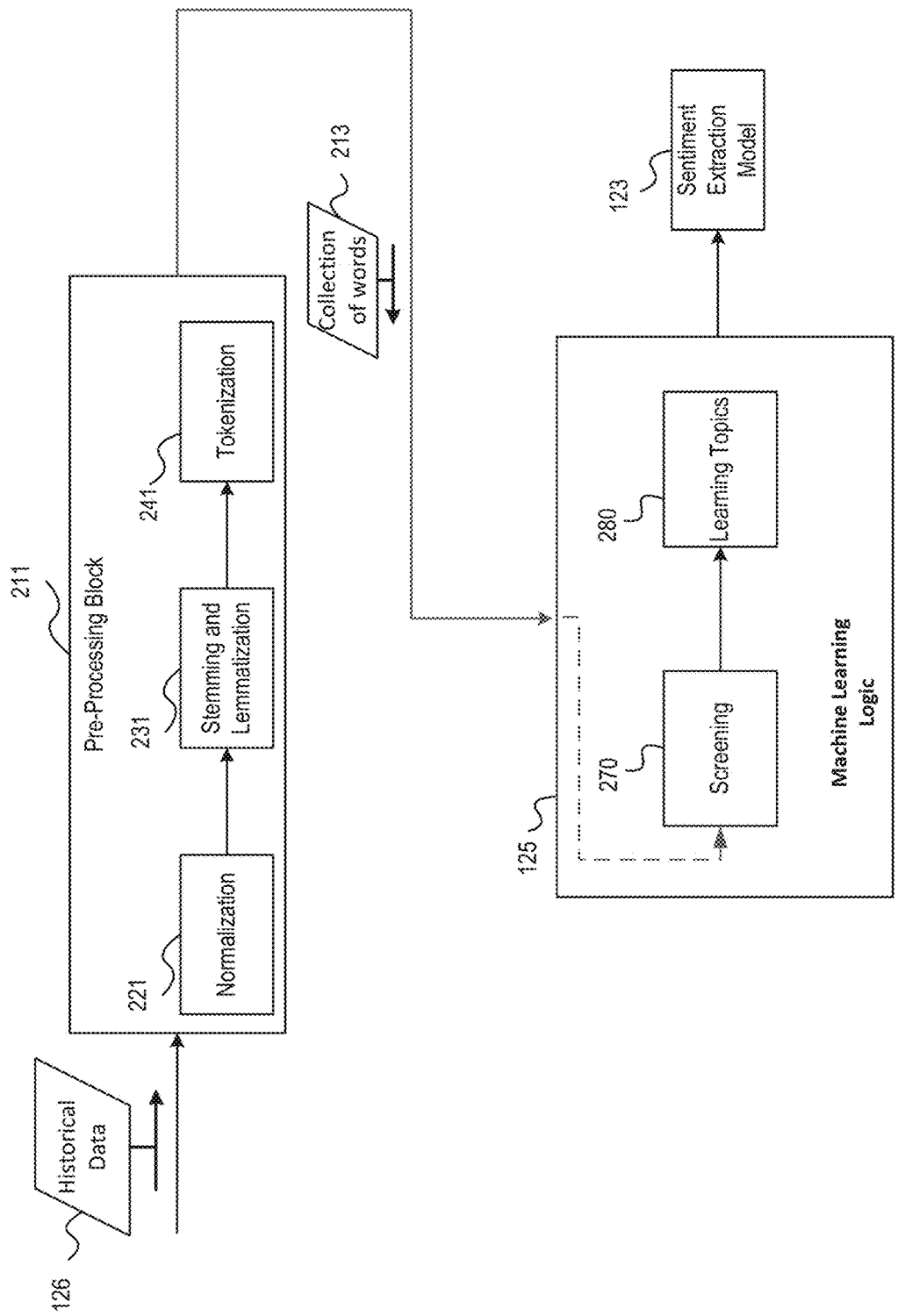
FIG. 2(B) is a block diagram illustrating a process for producing the sentiment extraction model using machine learning techniques, in accordance with aspects of the present disclosure.

As such, it is apparent that, in order to generate the sentiment extraction model 123, the features $O_+$, $O_-$, and $p_i$ may be derived from the historical news data and historical returns data. Referring to FIG. 2(B), a block diagram illustrating a process for producing the sentiment extraction model 123 using machine learning techniques in accordance with aspects of the present disclosure is shown. The block diagram shown in FIG. 2(B) depicts a pre-processing block 211 and a machine learning logic block 125; the pre-processing block 211 may be a part of the one or more return prediction engines and is configured to receive historical data 126, which may include historical news data and historical return data obtained from the data source 130. The pre-processing block may be configured to make the historical data 126 suitable for the machine learning logic 125, whereas the machine learning block 125, while generating features $O_+$, $O_-$ may be configured to generate estimators $\hat{S}$ and $\hat{O}$, which are further employed by the sentiment extraction model 123 to provide a sentiment score for current news articles.

As noted above, because the historical news data includes natural language raw textual data, the historical data 126 is not suitable as an input to the machine learning logic 125. To utilize the machine learning techniques disclosed herein, the raw textual data may be subjected to one or more transformations (e.g., the conditional rules described above) before being employed by the machine learning logic 125 to generate the sentiment extraction model 123. To that end, FIG. 2(B) depicts pre-processing block 211, which includes normalization block 221, stemming and lemmatization block 231, and tokenization block 241. The functions performed by the normalization block 221, stemming and lemmatization block 231, and tokenization block 241 are similar to the functions performed by the normalization block 220, stemming and lemmatization block 230, and tokenization block 240, respectively, as described above with reference to FIG. 2A, and may produce a collection of words 213 associated with each article. The collection of words may be provided to the machine learning logic 125 for further processing.

The machine learning logic 125 is configured to: (1) isolate a set of sentiment-charged words from the collection of words 213 for each article to generate the estimator $\hat{S}$ and (2) estimate topic parameters $O_+$ and $O_-$ for each article to generate the estimator $\hat{O}$. The machine learning logic 125 includes a screening block 270 that is configured to isolate a set of sentiment-charged words from the collection of words 213 for each article to generate the estimator $\hat{S}$, and the machine learning logic 125 includes a learning topics block 280 configured to estimate topic parameters $O_+$ and $O_-$ for each article to generate the estimator $\hat{O}$.

The screening block 270 receives the collection of words 213 from the pre-processing block 211. The collection of words 213 may include sentiment-neutral, -positive, and/or -negative words, and the sentiment-neutral words may be filtered out (e.g., because they do not impact sentiments or returns and thus, represent noise). To gather words that carry sentiment information, a supervised learning approach that leverages the information in historically realized stock returns may be utilized. Stated another way, the sentiment-charged words are filtered from the collection of words by assuming that if a word frequently co-occurs in articles that are accompanied by positive returns, that word is likely to convey positive sentiment. (The opposite, if a word frequently co-occurs in articles that are accompanied by negative returns, that word is likely to convey negative sentiment, holds true as well.)

In one implementation, the screening procedure may first calculate the frequency with which a word j co-occurs with a positive return. This is measured as:

$$f_j = \frac{\text{\# articles including word } j \text{ AND having sgn}(y) = 1}{\text{\# articles including word } j}$$

for each j=1, . . . , m. Equivalently, $f_j$ may be a slope coefficient of a cross-article regression of sgn($y$) on a dummy variable for whether word j appears in the article. The technique used in the screening procedure is not limiting; other techniques, such as multivariate regression with sparse regularization technique, may be employed.

After filtering out the sentiment-neutral words, the screening block 270 obtains a set S of sentiment-charged words. Following that, the screening block 270 isolates out all the positive sentiment words and the negative sentiment words. For that, the screening block 270 may set an upper threshold, $\alpha_+$, and define all words having $f_j > \frac{1}{2} + \alpha_+$, as positive sentiment words. Likewise, any word satisfying $f_j < \frac{1}{2} + \alpha_-$, for some lower threshold $\alpha_-$ may be deemed a negative sentiment word. In some implementations, a third threshold, $\varkappa$, may be selected. This third threshold may be related to the number of articles including word j (e.g., the denominator of $f_j$, which is denoted as $k_j$). Some sentiment words may appear infrequently, in which case their relevance to sentiment is not particularly clear. Thus, by analyzing words for which $k_j > \varkappa$, minimal statistical accuracy of the frequency estimate, $f_j$ is ensured. In some implementations, the thresholds ($\alpha_+$, $\alpha_-$, $\varkappa$,) may be considered hyper-parameters that can be tuned via cross-validation. Furthermore, given ($\alpha_+$, $\alpha_-$, $\varkappa$,), a list $\hat{S}$ of sentiment-charged words that appropriately exceed these thresholds may be constructed:

$$\hat{S} = \{j : f_j \geq \frac{1}{2} + \alpha_+, \text{ or } f_j \leq \frac{1}{2} - \alpha_-\} \cap \{j : k_j \geq \kappa\}.$$

After extracting $\hat{S}$, the screening block 270 is configured to provide the estimator $\hat{S}$ to the learning topics block 280. The learning topics block 280 is configured to fit a two-topic framework to gather information related to the number of sentiment-charged words in each article. In one implementation, the two topic vectors, $O_+$, $O_-$, may be first provided in a matrix form where $O=[O_+, O_-]$. O captures information on both the frequency of words as well as their sentiment. In some implementations, the topic vectors may be further decomposed into a vector of frequency, F, and a vector of tone, T:

$$F = \frac{1}{2}(O_+ + O_-), T = \frac{1}{2}(O_+ - O_-).$$

Decomposing into F and T can help provide the frequency and tone information. To illustrate, if a word has a larger value in F, it would mean that the word appears more frequently overall, and if a word has a larger value in T, it would mean that the sentiment is more positive.

As noted above, the parameter $p_i$ is an article's sentiment score as it describes how heavily the article tilts in favor of positive or negative topic. Assume that these sentiment scores are extracted and observed for all articles in the historical data. Let $d_{i,[S]} = d_{i,[S]}/s_i$ denote the vector of word frequencies. It can be implied that:

$$\mathbb{E}\tilde{d}_{i,[S]} = \mathbb{E}\frac{d_{i,[S]}}{s_i} = p_i O_+ + (1 - p_i) O_-,$$

or, in matrix form, $$\mathbb{E}\tilde{D}' = OW, \text{ where } W = \begin{bmatrix} p_1 & \cdots & p_n \\ 1-p_1 & \cdots & 1-p_n \end{bmatrix},$$

and $\tilde{D} = [\tilde{d}_1, \tilde{d}_2, \ldots, \tilde{d}_n]'$,

Based on this, the estimator $\hat{O}$ can be generated via a regression of $\tilde{D}'$ on W. To estimate W, standardized ranks of returns as sentiment scores for all articles in the training sample are used. More precisely, for each article i in the training sample i=1, . . . , n, $p_i$ is set as:

$$\hat{p}_i = \frac{\text{rank of } y_i \text{ in } \{y_l\}_{l=1}^n}{n},$$

and used to populate the matrix $\hat{W}$. Stated another way, this estimator $p_i$ leverages the fact that the return $y_i$ may be a noisy signal for the sentiment of news in article i.

Referring to the functioning of the sentiment extraction model 123 with respect to FIGS. 2(A) and 2(B), the sentiment extraction model 123 leverages the estimators $\hat{S}$ and $\hat{O}$ to predict a sentiment score. The sentiment extraction model 123 may assume the following relationship:

$$d_{i,[S]} \sim \text{Multinomial}(s_i p_i O_+ + (1-p_i) O_-)$$

where $d_i$ is an article's count vector, $s_i$ is total count of words carrying sentiment information correlated with historical positive or negative price movement, $d_{i,[S]}$ is the row vector corresponding to the $i^{th}$ row, $p_i$ is the article's sentiment score (which is to be estimated), and $O_+, O_-$ are the two topic vectors. As noted above in the description of FIG. 2(A), the feature extraction block 250 captures the parameters $d_i$ and $s_i$. of the new article, given estimator $\hat{S}$. Given the parameters $d_i$ and $s_i$., the estimator $\hat{O}$ facilitates estimating sentiment score associated with an asset using maximum likelihood estimation (MLE). In other implementations, linear regression may be used in place of MLE. In some implementations, the sentiment extraction model 123 may include a penalty term, such as:

$$\lambda \log((p_i(1-p_i))$$

which may help offset the limited number of the historical observations made by the machine learning logic 125. The penalty term may also offset the low signal-to-noise ratio inherent to return predictions. Furthermore, imposing the penalty term may reflect when an article has a neutral sentiment. It is noted that sentiment extraction model 123 is described as using features 212 to predict asset price movement for purposes of illustration, rather than by way of limitation and that the type of model disclosed herein (e.g., the sentiment extraction model 123) may be readily adapted, for instance, to accommodate other types of features obtained from the natural language processing of the raw textual data 202.

To illustrate the sentiment extraction model 123 capturing sentiment score (and in turn predict asset movement), assume that the following news article about a company A is provided as raw textual data 202 to the feature extraction block 210:

"Company A Profit Falls as Revenue Declines {4th Update By Jon Doe 1}

Company A is trying to reinvent itself as a modern technology innovator, but it is proving to be a tough act for the century-old company. On Monday, Company A reported second-quarter revenue fell 13.5%, adding to a string of quarterly declines that now spans 13 periods despite scaling back on legacy hardware and pushing into cloud-based software and services. Company A remains under assault from computing in the cloud, which threatens to undermine its hardware and infrastructure businesses and erode profit margins in the computing business. To win this fight, the company trimmed itself over the past year, exiting unprofitable server and chip-making businesses to focus instead on data analytics and security software as well as cloud and mobile computing products.

. . .

Company A says that these newer businesses are growing, but the company reported a year-over-year decline in all of its major lines. Technology services revenue was down 10%; business services fell 12%; software dropped 10%; and overall hardware revenue sank 32%. Company A profit dipped 16.6% to $3.45 billion, weighed down by acquisition-related charges.

Ham Day contributed to this article.

Write to Ham Day at ham.day@xyz.com and Jon Doe at jon.doe@xyz.com

Visit http://www.xyz.com/

Jul. 20, 2015 19:06 ET (23:06 GMT)"

Figures 10A, 10B:
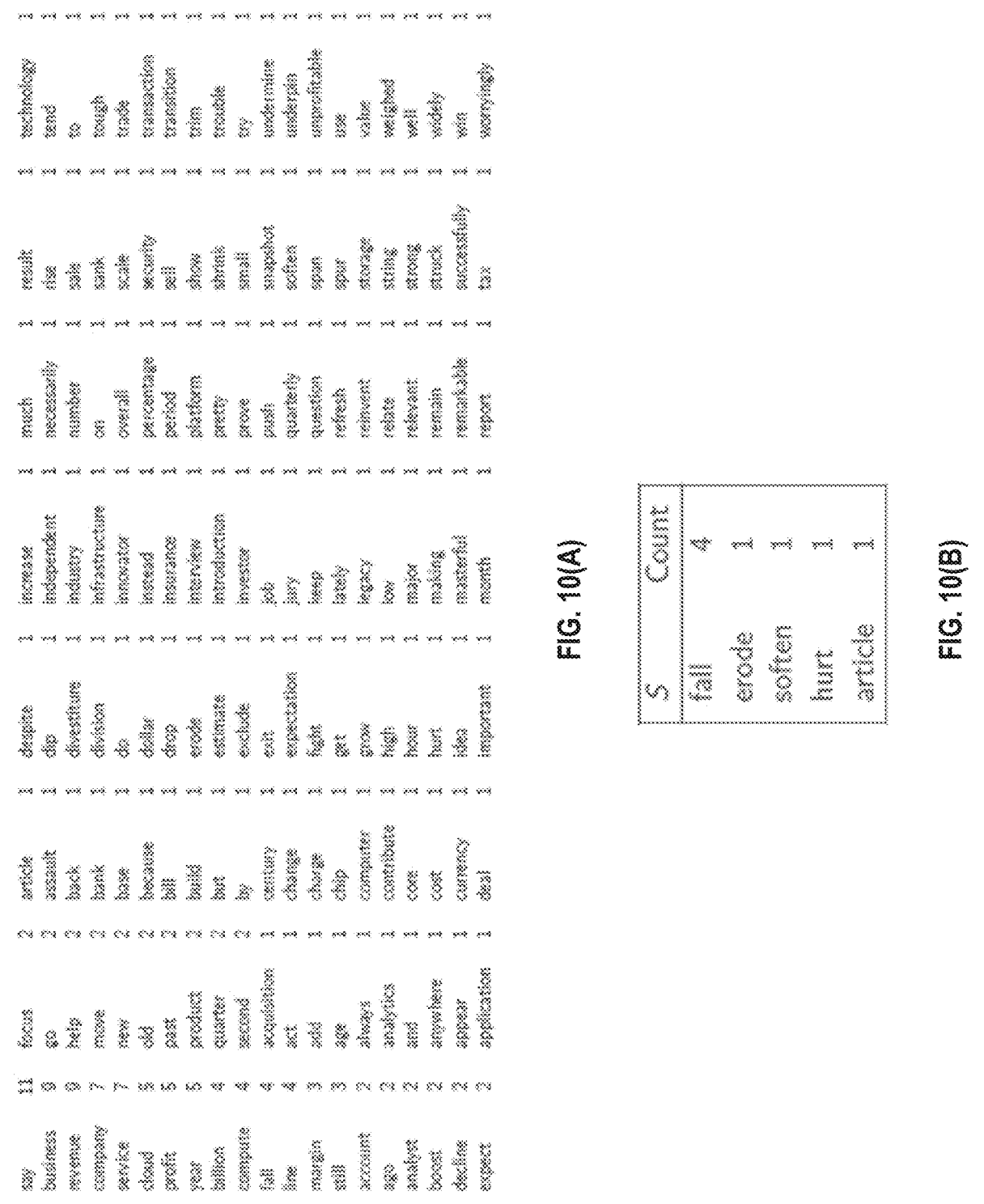

After receiving this article as raw textual data 202, the feature extraction block 210 may provide the article to the normalization block 220, the stemming and lemmatization block 230, and the tokenization block 240 to generate tokenized list of words. The feature extraction module 250 may extract the first parameter ($d_i$) by counting the number of times each tokenized word appear in the article. Referring to FIG. 10(A), an illustrative depiction of the first parameter extracted for the above-noted article about Company A is shown. FIG. 10(A) shows the number of times each tokenized word appears in the article. Following the extraction of the first parameter, the feature extraction module 250, in conjunction with the sentiment extraction model 123, may extract the second parameter ($s_i$). In one implementation, this may be performed by counting the number of words in the first parameter that are present in the estimator $\hat{S}$. Referring to FIG. 10(B), an illustrative table including the words from first parameter that are present in the estimator $\hat{S}$ is shown. The table also includes the frequency of each word in the article. As such, the information in the table can be used to calculate the total count of words in the article corresponding to the estimator $\hat{S}$. For example, in the case of the article in question, the second parameter would be 4+1+1+1+1=8. Given the first and second parameters, the sentiment extraction model 123 using estimator $\hat{O}$ is configured to estimate a sentiment score for this article using, for instance, maximum likelihood estimation (MLE).

Figure 3:
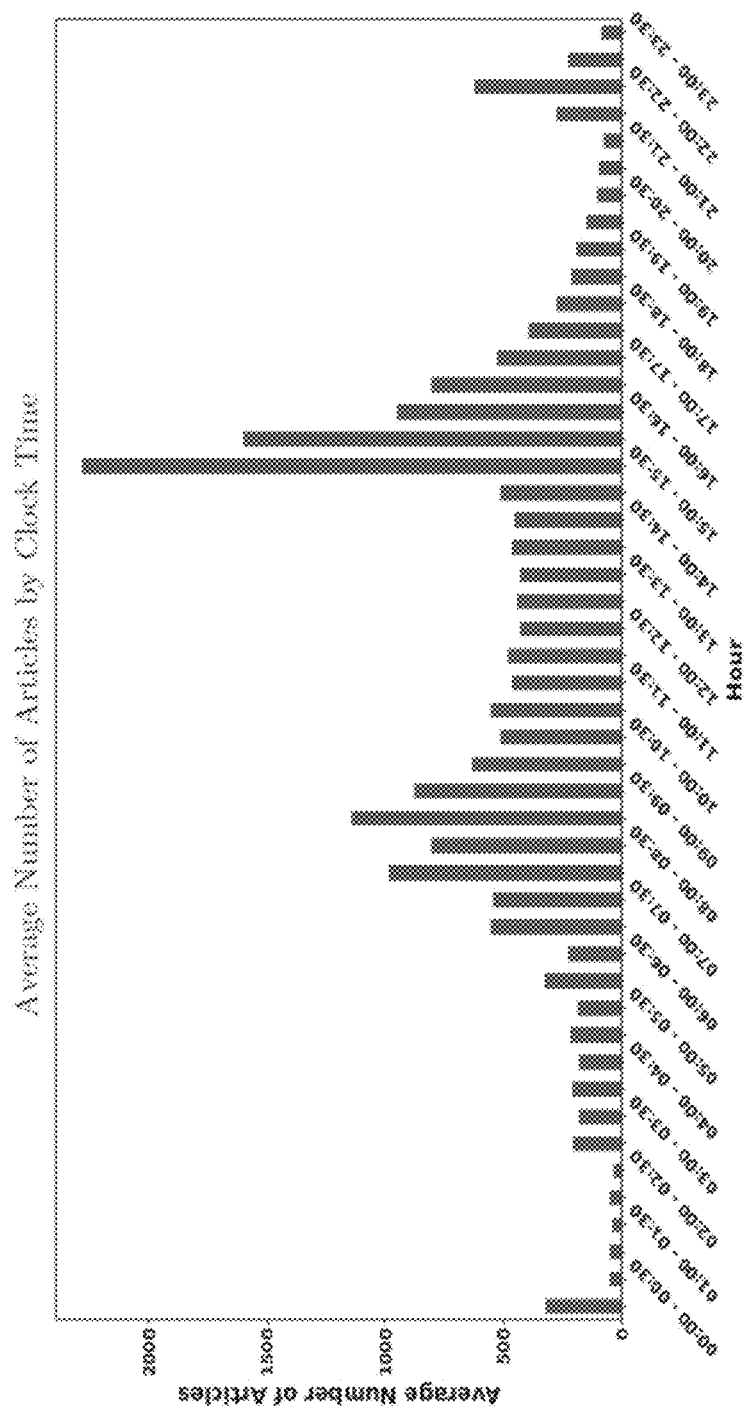
FIG. 3 is a graph illustrating average number of articles per half an hour from Jan. 1, 1989 to Jul. 31, 2017, in accordance with aspects of the present disclosure.

As noted above in the description of FIG. 1, the historical data 126 may include correlated news and returns data derived using the text feed and return information. In one implementation, the correlation may be performed by the ARP device 110 linking each article with tagged assets' market capitalization and daily returns information. Details related to gathering historical data 126 and linking each article with tagged assets' market capitalization and daily return information are now provided. As noted above, the historical news data may be obtained from the one or more data sources 130. Experimental testing of a system according to embodiments of the present disclosure was carried out using a text feed and archive that included real-time news feeds from Jan. 1, 1989 to Jul. 31, 2017, amounting to 22,471,222 unique articles (after combining the chained articles). Some news articles were assigned one or more firm tags (e.g., the article are tagged with the name of the company to which it pertains). To closely align the data with the above-described framework, articles with more than one firm tag were removed. The date, exact timestamp, tagged firm asset ticker, headline, and body text of each article were tracked. In some implementations, the headline, and body text of each article form raw textual data for each of the article. Using asset ticker tags from the historical news articles, each article was matched with tagged company's or firm's market capitalization and daily close-to-close returns obtained from data source 130. In some implementations, the sentiment extraction model 123 was trained by matching articles published on day t (more specifically, between 4 PM of day t−1 and 4 PM of day t) with the tagged company's three-day return from t−1 to t+1 (more specifically from market close on day t−2 to close on day t+1). The selected time range is supported by the graph shown in FIG. 3, illustrating average number of articles per half an hour from Jan. 1, 1989 to Jul. 31, 2017. The graph plots the average number of articles in each half-hour interval throughout the day between Jan. 1, 1989 to Jul. 31, 2017. Again, this timing was chosen as an example for the training of the model 123 to generate the required estimators. In other training schemes, different timing schedules may be chosen.

More details regarding the training of the sentiment extraction model 123 are now provided. The extraction model 123 may be trained using rolling window estimation technique. In one implementation, the rolling window includes a 15 year interval, the first 10 years of which may be used for training and the last 5 years may be used for validation and tuning of the model 123. The subsequent one-year window may be used for testing out-of-training sample data. At the end of the testing year, the entire analysis may be rolled forward by a year for re-training purposes. This procedure may be iterated until the full training data is utilized, which amounts to estimating and validating the model 14 times. It is noted that the process described above for training the model has been provided for purposes of illustration, rather than by way of limitation and that other training techniques may be utilized according to aspects of the present disclosure.

Figure 4:
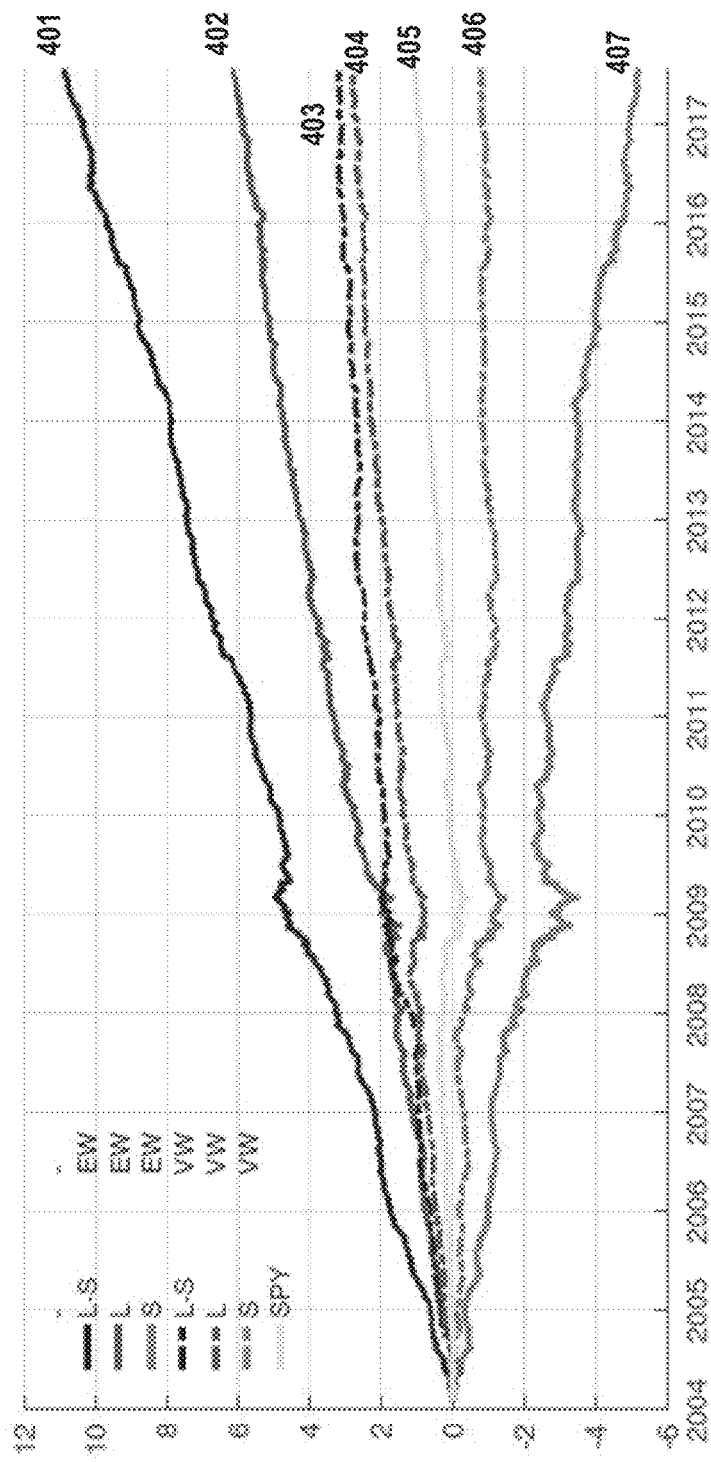
FIG. 4 is a graph illustrating performance of portfolios traded based on the sentiment extraction model, in accordance with aspects of the present disclosure.

Referring now to FIG. 4, cumulative returns for trading strategies implemented based on sentiment information extracted using sentiment extraction model 123 is shown. Various different trading strategies, including a long ("L") strategy, a short ("S") strategy, and a long-short ("L-S") strategy are shown. Referring briefly to FIG. 1, the trading engine 129 may provide a user GUI control relating to selecting various different trading strategies. Additionally, the trading engine 129 may provide a GUI control relating to executing one or more of the trading strategies on one or more assets or portfolios of assets constructed by the user based on sentiment scores.

Referring back to FIG. 4, the graph contrasts performance of equal-weighted ("EW") and value-weighted ("VW") versions of the strategies. Table 1 below reports corresponding summary statistics of these portfolios in detail. The trading strategy was designed to leverage sentiment estimates for prediction of asset movement. For the sake of simplicity, the trading strategy involved a zero-net investment portfolio that each day bought 50 stocks with the most positive sentiment scores and shorted 50 stocks with the most negative sentiment scores. The sentiment scores were extracted using the techniques on current news articles (e.g., news gathered from 9:30 AM of day 0 and 9 AM of day 1, the day when the trades were made) of a plurality of stocks and then sorted them based on their sentiment scores. Referring to FIG. 4, the EW L-S trajectory is notated as 401; the EW L trajectory is notated as 402; the EW S trajectory is notated as 407; the VW L-S trajectory is notated as 403; the VW L trajectory is notated as 404; the SPY trajectory is notated as 405; the VW S trajectory is notated as 406.

TABLE 1

| Formation | Sharpe Ratio | Average Turnover | Average Return | FF3 α | FF3 R² | FF5 α | FF5 R² | FF5 + MOM α | FF5 + MOM R² |
|---|---|---|---|---|---|---|---|---|---|
| EW L-S | 4.29 | 94.6% | 33 | 33 | 1.8% | 32 | 3.0% | 32 | 4.3% |
| EW L | 2.12 | 95.8% | 19 | 16 | 40.0% | 16 | 40.3% | 17 | 41.1% |
| EW S | 1.21 | 93.4% | 14 | 17 | 33.2% | 16 | 34.2% | 16 | 36.3% |
| VW L-S | 1.33 | 91.4% | 10 | 10 | 7.9% | 10 | 9.3% | 10 | 10.0% |
| VW L | 1.06 | 93.2% | 9 | 7 | 30.7% | 7 | 30.8% | 7 | 30.8% |
| VW S | 0.04 | 89.7% | 1 | 4 | 31.8% | 3 | 32.4% | 3 | 32.9% |

The table shows the performance of equal-weighted (EW) and value-weighted (VW) long-short (L-S) portfolios and their long (L) and short (S) legs. The performance measures include (annualized) annual Sharpe ratio, annualized expected returns, risk-adjusted alphas, and $R^2$s with respect to the Fama-French three-factor model ("FF3"), the Fama-French five-factor model ("FF5"), and the Fama-French five-factor model augmented to include the momentum factor ("FF5+MOM"). Table 1 also shows the strategy's daily turnover.

Table 2 lists sentiment charged words gathered using the sentiment extraction model 123. These are the words that most strongly correlated with realized price fluctuations and thus surpassed the correlation screening threshold.

TABLE 2

| Positive | | | Negative | | |
|---|---|---|---|---|---|
| Word | Score | Samples | Word | Score | Samples |
| undervalue | 0.596 | 13 | shortfall | 0.323 | 14 |
| repurchase | 0.573 | 14 | downgrade | 0.382 | 14 |
| surpass | 0.554 | 14 | diasppointing | 0.392 | 14 |
| upgrade | 0.551 | 14 | tumble | 0.402 | 14 |
| rally | 0.548 | 10 | blame | 0.414 | 14 |
| surge | 0.547 | 13 | hurt | 0.414 | 14 |
| treasury | 0.543 | 9 | plummet | 0.423 | 13 |
| customary | 0.539 | 11 | auditor | 0.424 | 14 |
| imbalance | 0.538 | 8 | plunge | 0.429 | 14 |
| jump | 0.538 | 11 | waiver | 0.429 | 12 |
| declare | 0.535 | 11 | miss | 0.43 | 13 |
| unsolicited | 0.535 | 9 | slowdown | 0.433 | 14 |
| up | 0.534 | 7 | halt | 0.435 | 11 |
| discretion | 0.531 | 10 | sluggish | 0.439 | 12 |
| buy | 0.531 | 9 | lower | 0.411 | 11 |
| climb | 0.528 | 9 | downward | 0.443 | 12 |
| bullish | 0.527 | 7 | warn | 0.444 | 12 |
| beat | 0.527 | 10 | fall | 0.446 | 11 |
| tender | 0.526 | 9 | covenant | 0.451 | 9 |
| top | 0.525 | 9 | woe | 0.452 | 9 |
| visible | 0.524 | 6 | slash | 0.453 | 10 |
| soar | 0.524 | 7 | resign | 0.454 | 11 |
| horizon | 0.523 | 4 | delay | 0.464 | 9 |
| tanker | 0.523 | 7 | subpoena | 0.454 | 9 |

TABLE 2-continued

| Positive | | | Negative | | |
|---|---|---|---|---|---|
| Word | Score | Samples | Word | Score | Samples |
| deepwater | 0.522 | 7 | lackluster | 0.455 | 10 |
| reconnaissance | 0.522 | 7 | soften | 0.456 | 11 |
| tag | 0.521 | 5 | default | 0.46 | 9 |
| deter | 0.521 | 3 | soft | 0.46 | 9 |
| valve | 0.519 | 6 | widen | 0.46 | 9 |
| foray | 0.519 | 3 | postpone | 0.46 | 10 |
| clip | 0.519 | 4 | unfortunately | 0.46 | 10 |
| fastener | 0.519 | 7 | insufficient | 0.462 | 8 |
| bracket | 0.519 | 7 | unlawful | 0.462 | 10 |

TABLE 2-continued

| Positive | | | Negative | | |
|---|---|---|---|---|---|
| Word | Score | Samples | Word | Score | Samples |
| potent | 0.519 | 4 | issuable | 0.462 | 9 |
| unanimously | 0.519 | 6 | unfavorable | 0.462 | 8 |
| buoy | 0.518 | 3 | regain | 0.462 | 9 |
| bake | 0.518 | 3 | deficit | 0.462 | 9 |
| get | 0.518 | 3 | irregularity | 0.463 | 9 |
| fragment | 0.518 | 4 | erosion | 0.464 | 8 |
| activist | 0.518 | 3 | bondholder | 0.464 | 9 |
| cardiology | 0.518 | 3 | weak | 0.465 | 9 |
| oversold | 0.517 | 2 | hamper | 0.465 | 9 |
| bidder | 0.517 | 6 | overrun | 0.467 | 3 |
| cheer | 0.517 | 3 | inefficiency | 0.467 | 7 |
| exceed | 0.517 | 7 | persistent | 0.468 | 7 |
| terrain | 0.517 | 6 | notify | 0.468 | 9 |
| terrific | 0.516 | 3 | allotment | 0.469 | 8 |
| upbeat | 0.516 | 3 | worse | 0.469 | 7 |
| gratify | 0.516 | 6 | setback | 0.471 | 7 |
| armor | 0.516 | 6 | grace | 0.472 | 5 |

Figure 5:
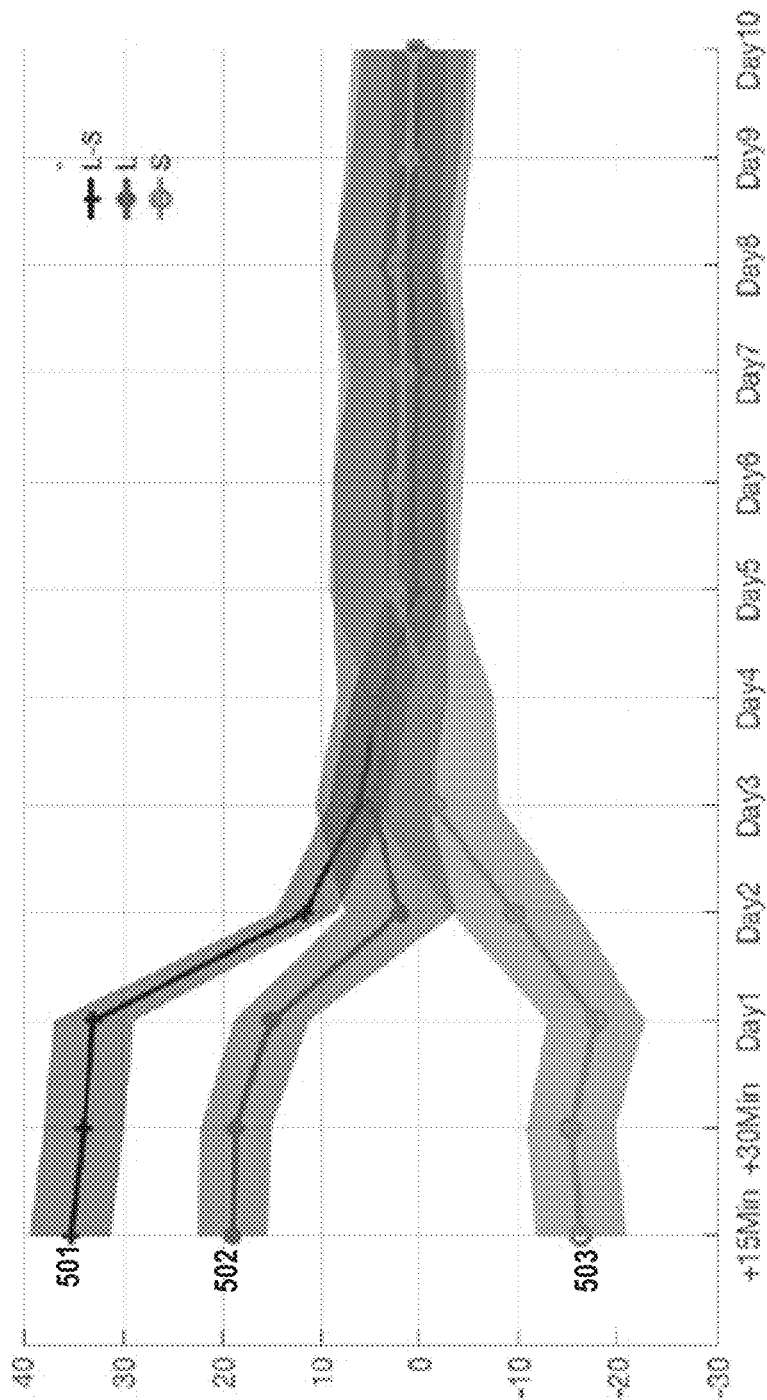
FIG. 5 is a graph illustrating the speed at which news assimilates and materializes in market performance, in accordance with aspects of the present disclosure.

Referring now to FIG. 5, a graph illustrating the speed at which news assimilates and materializes in market performance is shown. The graph shown in FIG. 5 was generated after considering very rapid price responses via intra-day high frequency trading that takes a position either 15 or 30 minutes (denoted in the graph) after one or more articles' time stamp, and holds position until the market is opened the next day. The L-S trajectory is notated as 501; the L trajectory is notated as 502; and the S trajectory is notated as 503. Average returns higher than S&P's returns in basis points per day with shaded 95% confidence intervals are observed. For all the strategies, sentiment information is observed to be essentially fully incorporated into prices by the start of Days 3 and 4.

Referring back to FIG. 1, the ARP device 110 may be further configured to gauge the freshness or staleness of a current news article. For example, it is clear that old news articles may have already been absorbed in the stock prices, and gauging the freshness or staleness of the news articles may facilitate making an informed decision about a trade. As such, the ARP device 110, via the GUI, provides a user with information related to the "freshness" of one or more news articles upon which one or more sentiment scores are based. In one implementation, the sentiment extraction model 123 may take the freshness of the news into account while determining a sentiment score. The freshness of an article may be gauged, in one implementation, using the following technique. For each article for company i on day t, the cosine similarity of each article with all articles about the company I on the five trading days prior to t may be calculated:

$$Freshness_{i,t} = 1 - \max_{j \in \chi_{i,t}} \left( \frac{d_{i,t} \cdot d_j}{\|d_{i,t}\| \|d_j\|} \right).$$

Figure 6:
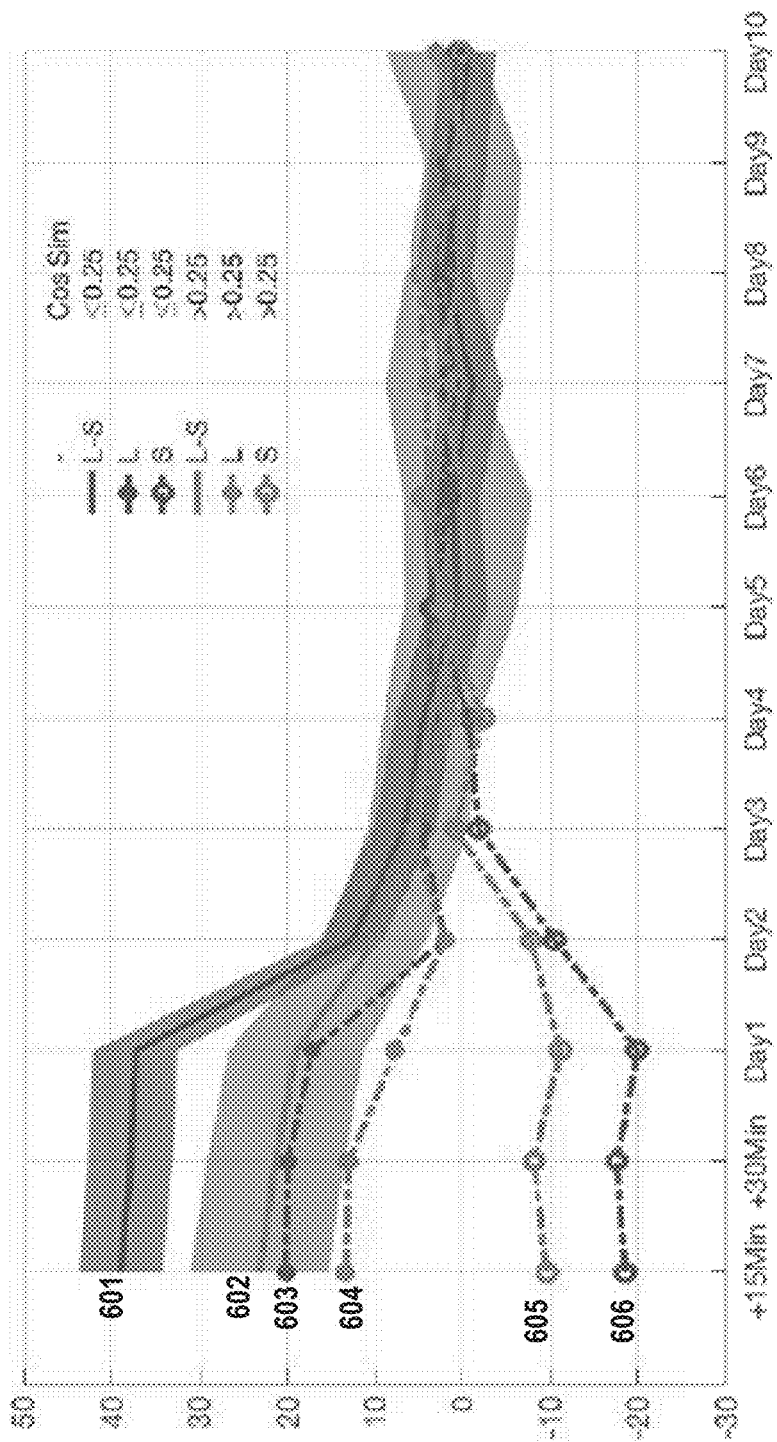
FIG. 6 is a graph comparing the speed at which old and fresh news assimilates and materializes in market performance, in accordance with aspects of the present disclosure.

Referring now to FIG. 6, a graph illustrating the speed at which news assimilates into stock prices is shown. To plot the graph, fresh news was defined to have freshness score of 0.75 or more, while stale news was defined to have a freshness score below 0.75. It was observed that the one-day price response (from fifteen minutes after news arrival to the open the following day) of the LS portfolio formed on fresh news (trajectory notated as 601) is at 39 basis points, nearly double the 23 basis point response to stale news (trajectory notated as 602). Furthermore, it is observed that it takes four days for fresh news to be fully incorporated in prices. The L trajectory with Cos Sim value less than 0.25 is notated as 603; the L trajectory with Cos Sim value greater than 0.25 is notated as 604; the S trajectory with Cos Sim value greater than 0.25 is notated as 605; the S trajectory with Cos Sim value less than 0.25 is notated as 606.

Figure 9:
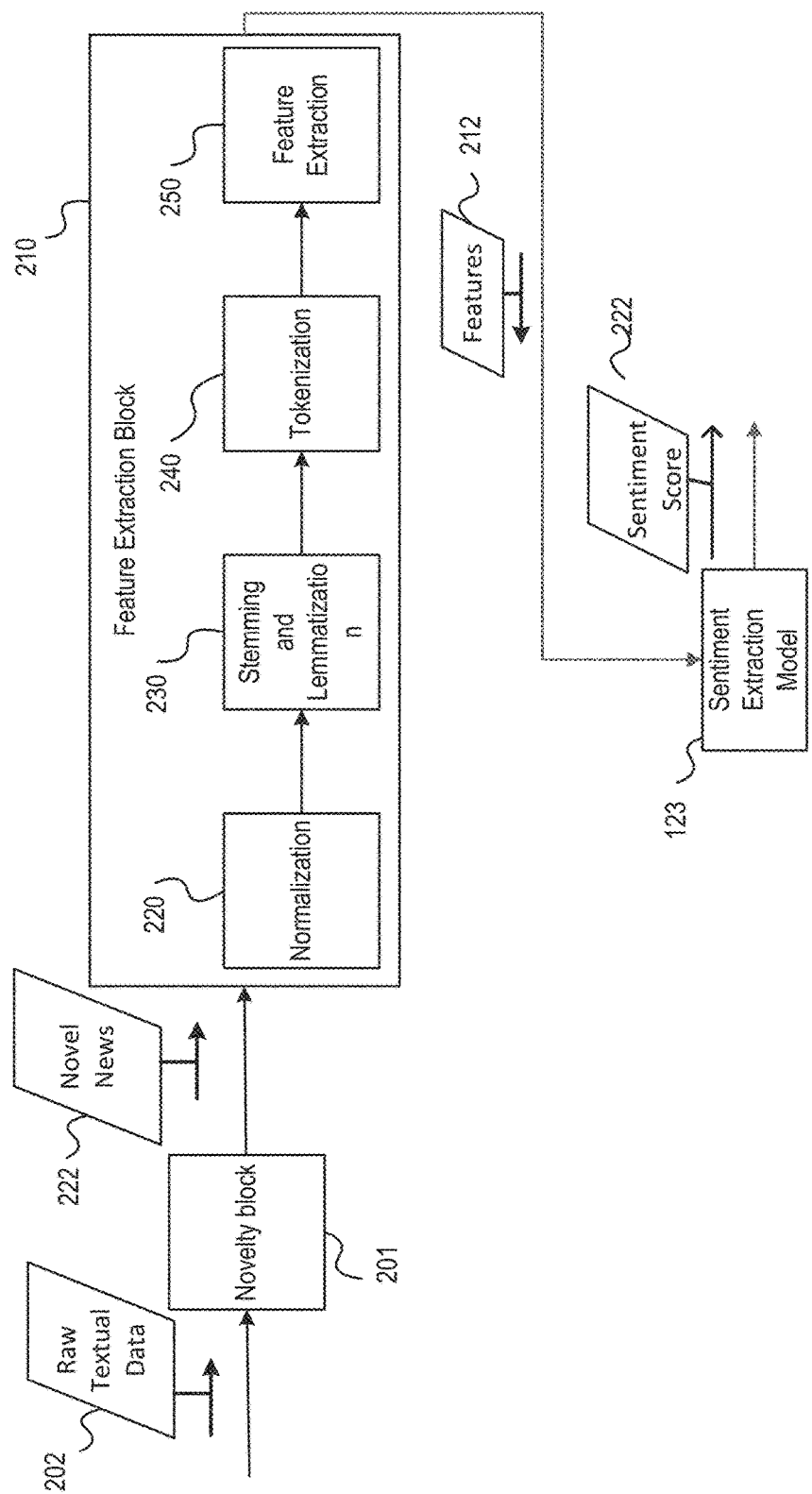
FIG. 9 is a process for filtering fresh news from current news into a set of features suitable for use with the sentiment extraction model, in accordance with aspects of the present disclosure.

As noted above, the sentiment extraction model 123 may take the freshness of the news into account while determining a sentiment score. As such, FIG. 2(A) may be adapted to include the a freshness block 201 that only allows news with a certain freshness score that indicates the freshness/staleness of the news articles to be processed by the feature extraction block. An example implementation of such a system is shown in FIG. 9. FIG. 9 depicts a freshness block 201, which, in one implementation could be a part of the return prediction engine 128, placed before the feature extraction block 210. As shown in FIG. 9, raw textual data 202 (e.g., natural language data obtained from one or more news articles via data source 130) may be provided to the freshness block 201 which, using the technique described above, may only allow news with a freshness score higher than a threshold freshness score. The threshold freshness score could be set by the user using GUI controls provided by the trading engine 129. Once the novel news is short-listed, the feature extraction block 210 and sentiment extraction model 123 perform functions similar to the functions described above with respect to FIG. 2(A).

Figure 7:
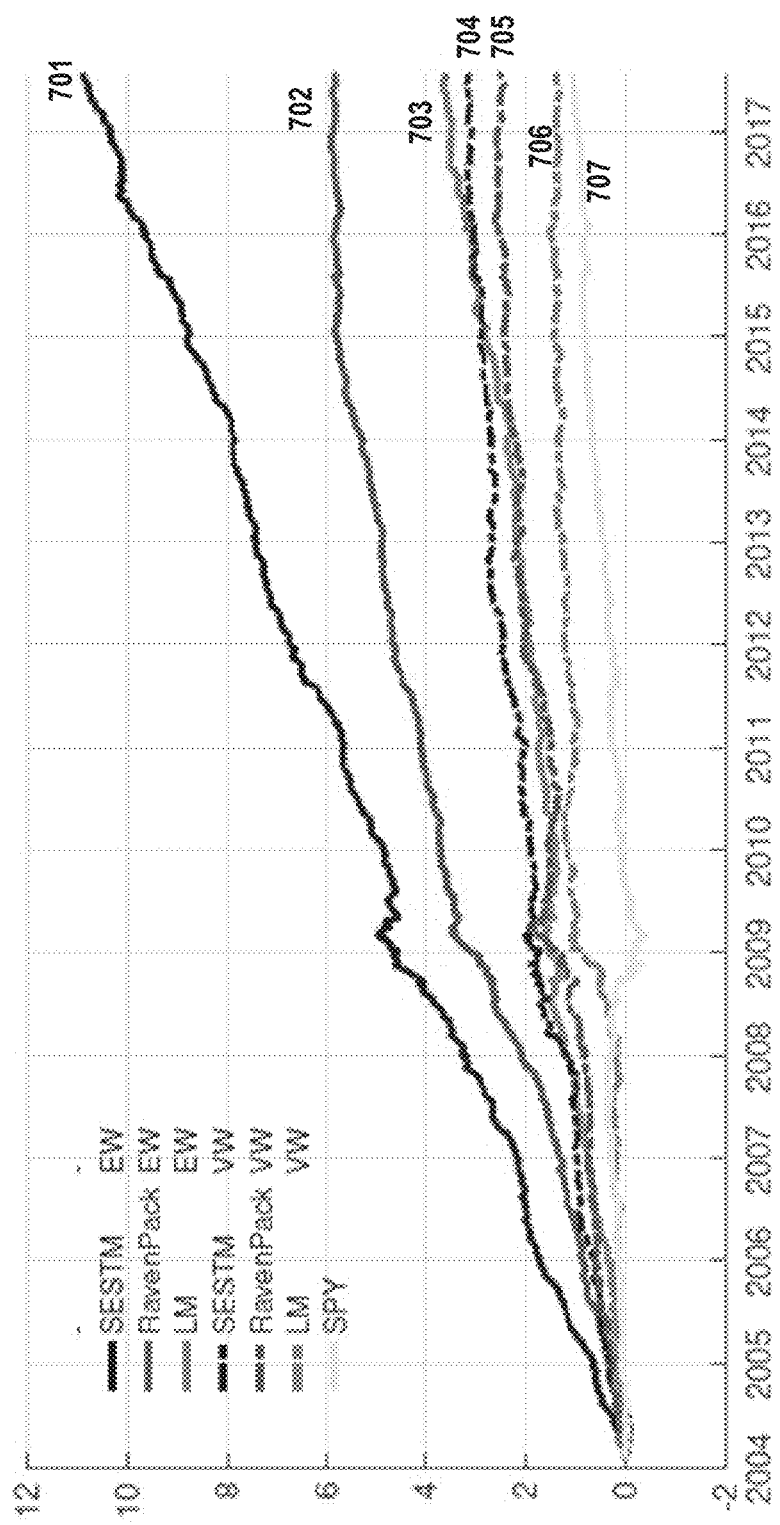
FIG. 7 is a graph comparing performance of portfolios constructed using the sentiment scores predicted by the sentiment extraction model, in accordance with aspects of the present disclosure.

Referring now to FIG. 7, a graph comparing performance of portfolio constructed using the sentiment scores predicted by the sentiment extraction model with performance of portfolio constructed using the sentiment scores predicted by other commonly used techniques (e.g., RavenPack and LM dictionary) is shown. It is observed that performance of a portfolio constructed using the sentiment extraction model 123 (also referred in FIG. 7 as SESTM) is substantially better than the currently used techniques. The EW SESTM trajectory is notated as 701; the EW RavenPack trajectory is notated as 702; and the EW LM trajectory is notated as 703. Thus, it is clear that for EW strategy, the portfolio constructed using the sentiment scores predicted by the sentiment extraction model provides significantly better performance than the others. Similarly, the VW SESTM trajectory is notated as 704; the VW RavenPack trajectory is notated as 705; the VW LM trajectory is notated as 706; and the SPY trajectory is notated as 707. Even for VW strategy, the portfolio constructed using the sentiment scores predicted by the sentiment extraction model provides significantly better performance than the others.

Figure 8:
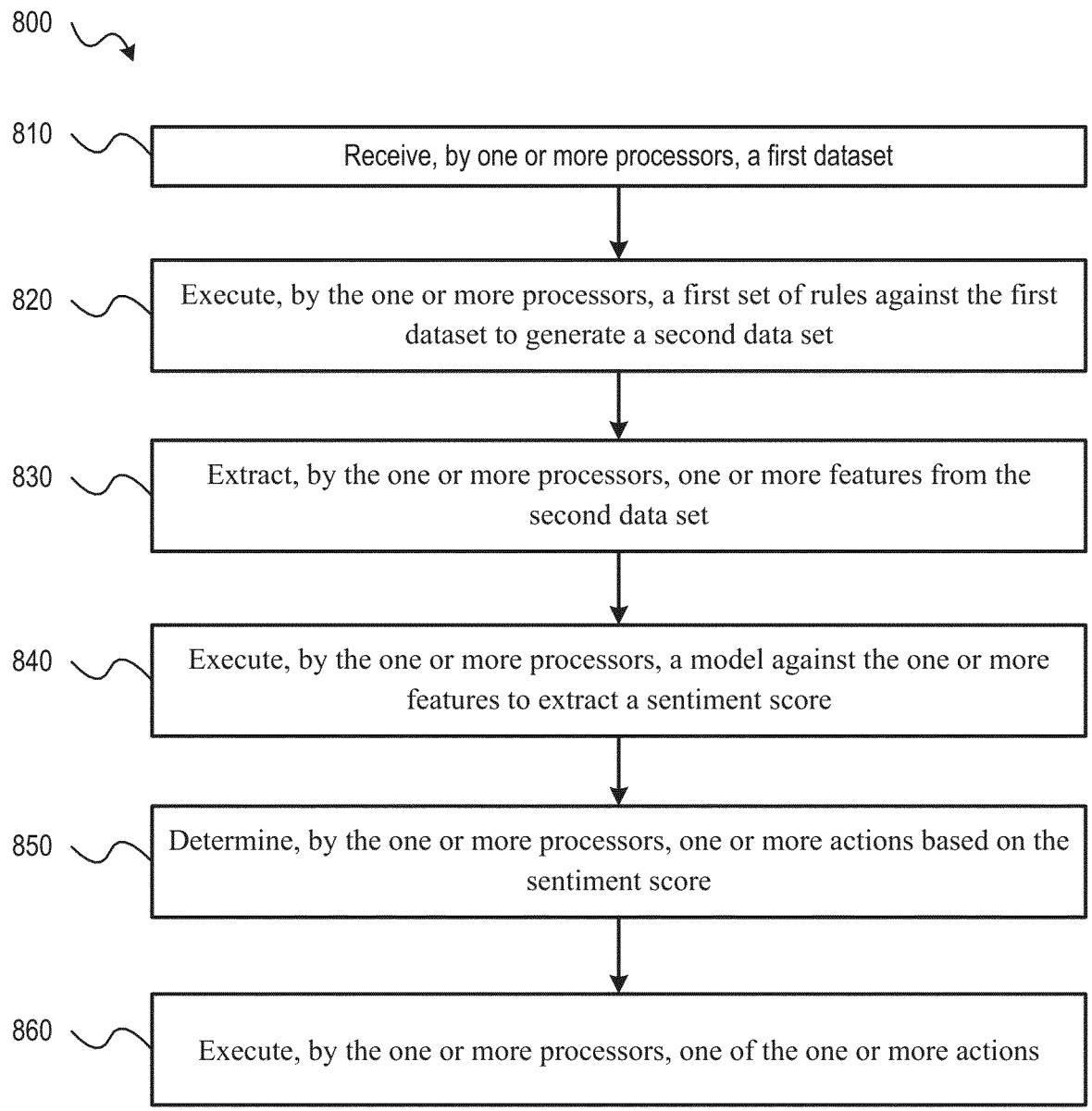
FIG. 8 is an illustrative method for utilizing a sentiment extraction model to predict asset movement, in accordance with aspects of the present disclosure.

Referring to FIG. 8, a flow diagram of an illustrative method for predicting asset movement by executing the sentiment extraction model 123, in accordance with aspects of the present disclosure is shown as a method 800. In an aspect, the steps of the method 800 may be performed by a system, such as by the system 100 of FIG. 1 and more specifically the ARP device 110 of FIG. 1. The steps of the method 800 may be stored as instructions (e.g., the instructions 122 of FIG. 1) that, when executed by one or more processors (e.g., the one or more processors 112 of FIG. 1), cause the one or more processors to perform the steps of the method 800.

At step 810, the method 800 includes receiving, by one or more processors, a first dataset. In an aspect, the first dataset may be the raw textual dataset 202 of FIG. 2(A). The first dataset may include natural language data captured from one or more news articles pertaining to one or more assets. At step 820, the method 800 includes executing, by the one or more processors, a first set of rules against the first dataset to generate a second dataset. In an aspect, the first set of rules may be configured to perform the operations described above with respect to the feature extraction block 210 of FIG. 2(A). For example, the first set of rules may be configured to generate an intermedia dataset using one or more data conditioning processes. The one or more data conditioning processing may include one or more of the processes described with reference to the feature extraction block 210 of FIG. 2(A), such as removal of punctuation, removal of stop words, removal of spaces, lemmatization, stemming, tokenization, or combinations thereof. The execution of the first set of rules against the input dataset may be configured to generate an intermediate dataset or a second data set.

At step 830, the method 800 includes extracting, by the one or more processors, one or more features from the second dataset. In an aspect, the features may be extracted as described above with respect to FIGS. 1-2B and FIG. 9. At step 840, the method 800 includes executing, by the one or more processors, the sentiment extraction model 123 against the one or more features to generate one or more sentiment scores. In an aspect, the sentiment extraction model 123 may be generated as described with reference to FIG. 2(B), and the one or more sentiment scores may be generated as described with reference to FIG. 2(A). At step 850, the method 800 includes determining, by the one or more processors, one or more actions based on the sentiment score. The one or more actions may include executing a trade based on the sentiment score, forming a portfolio of assets using sentiment scores obtained for different assets, selecting one or more trading strategies to be applied to the one or more constructed portfolios, and the like. At step 860, the method 800 includes executing, by the one or more processors, one of the one or more actions. The one of the one or more actions may include communicating with one or more trading marketplaces. Such actions may be executed by one or more processors via API or other different programming interfaces.

Additionally, the techniques disclosed herein may facilitate more robust testing. To illustrate, although the testing processes disclosed herein have primarily been described in the context of testing program code, aspects of the present disclosure may be readily adapted to other types of tests, which may only require additional training of the artificial intelligence models utilized to automate the test configuration processes. This capability enables testing tools configured in accordance with aspects of the present disclosure to be adapted to different testing scenarios and input datasets while still providing a high confidence level in terms of testing efficiency and test coverage.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A machine learning system for utilizing a trained machine learning model to predict returns for traded assets based on training of the machine learning model using historical news articles and historical returns data, the system comprising:
   a communication interface configured to receive, from one or more data sources, the historical news articles and the historical returns data corresponding to one or more traded assets;
   a memory storing the machine learning model that predicts returns for traded assets based on sentiment of one or more current news articles and correlations between sentiment and returns derived through training of the machine learning model using the historical news articles and historical returns data for a plurality of traded assets; and
   one or more processors communicatively coupled to the memory, the one or more processors configured to:
      compile a training dataset comprising historical data, the historical data comprising the historical news articles and the historical returns data corresponding to one or more traded assets, wherein each of the historical news articles relates to a particular traded asset during a pre-defined period of time and comprises textual data in the form of natural language text;
      train the machine learning model based on the training dataset, wherein the training comprises:
      pre-processing the textual data of at least a portion of the historical news articles using natural language processing to produce training data configured to be input into the machine learning model, the natural language processing comprising normalization, stemming, lemmatization, and tokenization of the textual data;
      extracting words carrying sentiment information from each of the historical news articles based on based on the historical returns data;
      configuring a first estimator with a set of words carrying sentiment information based on the words extracted from each of the historical news articles, wherein the set of words carrying sentiment information comprise words carrying positive sentiment and words carrying negative sentiment;
      analyzing the set of words carrying sentiment information for each of the historical news articles and the historical returns data using a multi-topic model to identify correlations between each word in the set of words carrying sentiment information and positive returns and correlations between each word in the set of words carrying sentiment information and negative returns, wherein positive returns correspond to a first topic of the multi-topic model and negative returns correspond to a second topic of the multi-topic model; and
      configuring a second estimator based on the identified correlations between each word in the set of words carrying sentiment information and positive returns or negative returns, wherein configuration of the second estimator enables the second estimator to assign a higher probability to word frequencies that co-occur with positive returns based on the correlations identified between each word in the set of words and positive returns based on the historical return data and to assign a lower probability to word frequencies that co-occur with negative returns based on the correlations identified between each word in the set of words and negative returns based on the historical return data;
   receive a first data set associated with a first traded asset, the first data set comprising textual data in the form of natural language data from one or more current news articles regarding the first traded asset;
   execute the trained machine learning model against the one or more current news articles of the first data set to generate a sentiment score for the first traded asset, wherein executing the machine learning model comprises:
      pre-processing the first data set using the natural language processing to generate a second data set;
      processing the second data set using the first estimator to extract one or more features from the second data set, where the one or more extracted features include sentiment information for the first traded asset based on the one or more current news articles, wherein the one or more extracted features include a first set of words carrying sentiment information; and
      generating, by the second estimator, the sentiment score for the first traded asset based on correlations between the first set of words carrying sentiment information and positive returns or negative returns;
   determine one or more trading actions for the first traded asset based on the sentiment score; and
   execute the one or more trading actions for the first traded asset.

2. The machine learning system of claim 1, wherein the normalization comprises one or more processes selected from the group consisting of: removal of punctuation, removal of stop words, and removal of spaces.

3. The machine learning system of claim 1, wherein the one or more features includes a count vector pertaining to the first set of words.

4. The machine learning system of claim 1, wherein one the or more processors are configured to:
  determine a freshness or staleness of the one or more current news articles, wherein the sentiment score for the first traded asset accounts for the freshness or staleness of the one or more current news articles.

5. The machine learning system of claim 1, where the one or more processors are configured to:
  receive additional current news articles associated with one or more additional traded assets:
  execute the trained machine learning model against the additional current news articles to generate sentiment scores for each of the one or more additional traded assets;
  determine trading actions for the one or more additional traded assets based on the sentiment scores generated based on the additional current news articles; and
  execute at least one trading action of the trading actions for the one or more additional traded assets.

6. The machine learning system of claim 1, where the one or more trading actions comprises:
  forming a first portfolio comprising the first traded asset and a second traded asset; and
  executing at least one additional trading action of the one or more trading actions on the first portfolio in a first time frame.

7. A non-transitory computer-readable storage medium storing instructions that, when executed by one or more processors, cause the one or more processors to perform operations for utilizing a trained machine learning model to predict returns for traded assets based on training of the machine learning model using historical news articles and historical returns data, the operations comprising:
  receiving, from one or more data sources, the historical news articles and the historical returns data;
  storing the machine learning model in a memory device, wherein the machine learning model predicts returns for traded assets based on sentiment of one or more current news articles and correlations between sentiment and returns derived through training of the machine learning model using the historical news articles and historical returns data for a plurality of traded assets; and
  compiling a training dataset comprising historical data, the historical data comprising the historical news articles and the historic returns data corresponding to one or more traded assets, wherein each of the historical news articles relates to a particular traded asset during a pre-defined period of time and comprises textual data in the form of natural language text;
  training the machine learning model based on the training dataset, wherein the training comprises:
    pre-processing the textual data of at least a portion of the historical news articles using natural language processing to produce training data configured to be input into the machine learning model, the natural language processing comprising normalization, stemming, lemmatization, and tokenization of the textual data;
    extracting words carrying sentiment information from each of the historical news articles based on based on the historical returns data;
    configuring a first estimator with a set of words carrying sentiment information based on the words extracted from each of the historical news articles, wherein the set of words carrying sentiment information comprise words carrying positive sentiment and words carrying negative sentiment;
    analyzing the set of words carrying sentiment information for each of the historical news articles and the historical returns data using a multi-topic model to identify correlations between each word in the set of words carrying sentiment information and positive returns and correlations between each word in the set of words carrying sentiment information and negative returns, wherein positive returns correspond to a first topic of the multi-topic model and negative returns correspond to a second topic of the multi-topic model; and
    configuring a second estimator based on the identified correlations between each word in the set of words carrying sentiment information and positive returns or negative returns, wherein configuration of the second estimator enables the second estimator to assign a higher probability to word frequencies that co-occur with positive returns based on the correlations identified between each word in the set of words and positive returns based on the historical return data and to assign a lower probability to word frequencies that co-occur with negative returns based on the correlations identified between each word in the set of words and negative returns based on the historical return data;
  receiving a first data set associated with a first traded asset, the first data set comprising textual data in the form of natural language data from one or more current news articles regarding the first traded asset;
  executing the trained machine learning model against the one or more current news articles of the first data set to generate a sentiment score for the first traded asset, wherein executing the machine learning model comprises:
    pre-processing the first dataset using the natural language processing to generate a second data set;
    processing the second data set using the first estimator to extract one or more features from the second data set, where the one or more extracted features include sentiment information for the first traded asset based on the one or more current news articles, wherein the one or more extracted features include a first set of words carrying sentiment information; and
    generating, by the second estimator, the sentiment score for the first traded asset based on correlations between the first set of words carrying sentiment information and positive returns or negative returns;
  determining one or more trading actions for the first traded asset based on the sentiment score; and
  executing the one or more trading actions for the first traded asset.

8. The non-transitory computer-readable storage medium of claim 7, where the normalization comprises one or more processes selected from the group consisting of: removal of punctuation, removal of stop words, and removal of spaces.

9. The non-transitory computer-readable storage medium of claim 7, where the one or more features includes a count vector pertaining to the first set of words.

10. The non-transitory computer-readable storage medium of claim 7, where the operations further comprising:
  determining a freshness or staleness of the one or more current news articles, wherein the sentiment score for the first traded asset accounts for the freshness or staleness of the one or more current news articles.

11. The non-transitory computer-readable storage medium of claim 7, the operations further comprising:
receive additional current news articles associated with one or more additional traded assets;
execute the trained machine learning model against the additional current news articles to generate sentiment scores for each of the one or more additional traded assets;
determine trading actions for the one or more additional traded assets based on the sentiment scores generated based on the additional current news articles; and
execute at least one trading action of the trading actions for the one or more additional traded assets.

12. The non-transitory computer-readable storage medium of claim 7, wherein the one or more actions for the first traded asset include forming a first portfolio comprising the first traded and one or more additional traded assets.

13. A method for utilizing a trained machine learning model to predict returns for traded assets based on training of the machine learning model using historical news articles and historical returns data, the method comprising:
receiving, via a communication interface, the historical news articles and the historical returns data from one or more data sources;
storing the machine learning model in a memory, wherein the machine learning predicts returns for traded assets based on sentiment of one or more current news articles and correlations between sentiment and returns derived through training of the machine learning model using the historical news articles and historical returns data for a plurality of traded assets; and
compiling a training dataset comprising historical data, the historical data comprising the historical news articles and the historical returns data corresponding to one or more traded assets, wherein each of the historical news articles relates to a particular traded asset during a pre-defined period of time and comprises textual data in the form of natural language text;
training the machine learning model based on the training dataset, wherein the training comprises:
pre-processing the textual data of at least a portion of the historical news articles using natural language processing to produce training data configured to be input into the machine learning model, the natural language processing comprising normalization, stemming, lemmatization, and tokenization of the textual data;
extracting words carrying sentiment information from each of the historical news articles based on based on the historical returns data;
configuring a first estimator with a set of words carrying sentiment information based on the words extracted from each of the historical news articles, wherein the set of words carrying sentiment information comprise words carrying positive sentiment and words carrying negative sentiment;
analyzing the set of words carrying sentiment information for each of the historical news articles and the historical returns data using a multi-topic model to identify correlations between each word in the set of words carrying sentiment information and positive returns and correlations between each word in the set of words carrying sentiment information and negative returns, wherein positive returns correspond to a first topic of the multi-topic model and negative returns correspond to a second topic of the multi-topic model; and configuring a second estimator based on the identified correlations between each word in the set of words carrying sentiment information and positive returns or negative returns, wherein configuration of the second estimator enables the second estimator to assign a higher probability to word frequencies that co-occur with positive returns based on the correlations identified between each word in the set of words and positive returns based on the historical return data and to assign a lower probability to word frequencies that co-occur with negative returns based on the correlations identified between each word in the set of words and negative returns based on the historical return data;
receiving a first data set associated with a first traded asset, the first data set comprising textual data in the form of natural language data from one or more current news articles regarding the first traded asset;
executing the trained machine learning model against the one or more current news articles of the first data set to generate a sentiment score for the first traded asset, wherein executing the machine learning model comprises:
pre-processing the first dataset using the natural language processing to generate a second data set;
processing the second data set using the first estimator to extract one or more features from the second data set, where the one or more extracted features include sentiment information for the first traded asset based on the one or more current news articles, wherein the one or more extracted features include a first set of words carrying sentiment information; and
generating, by the second estimator, the sentiment score for the first traded asset based on correlations between the first set of words carrying sentiment information and positive returns or negative returns;
determining one or more trading actions for the first traded asset based on the sentiment score; and
executing the one or more trading actions for the first traded asset.

14. The method of claim 13, wherein the normalization comprises one or more processes selected from the group consisting of: removal of punctuation, removal of stop words, and removal of spaces.

15. The method of claim 13, wherein the one or more features includes a count vector pertaining to the first set of words.

16. The method of claim 13, further comprising:
determining a freshness or staleness of the one or more current news articles, wherein the sentiment score for the first traded asset accounts for the freshness or staleness of the one or more current news articles.

17. The method of claim 13, further comprising:
receive additional current news articles associated with one or more additional traded assets:
execute the trained machine learning model against the additional current news articles to generate sentiment scores for each of the one or more additional traded assets;
determining trading actions for the one or more additional traded assets based on the score sentiment scores generated based on the additional current news articles; and
executing at least one trading action of the trading actions for the one or more additional traded assets.

18. The method of claim 13, wherein the one or more trading actions includes forming a portfolio of assets that includes the first traded asset based on the sentiment score.

\* \* \* \* \*